(12) United States Patent
Ito et al.

(10) Patent No.: US 8,060,716 B2
(45) Date of Patent: Nov. 15, 2011

(54) INFORMATION PROCESSING DEVICE FOR SECURELY PROCESSING DATA THAT NEEDS TO BE PROTECTED USING A SECURE MEMORY

(75) Inventors: Takayuki Ito, Osaka (JP); Manabu Maeda, Osaka (JP); Yoshikatsu Ito, Osaka (JP)

(73) Assignee: Panasonic Corporation, Osaka (JP)

( * ) Notice: Subject to any disclaimer, the term of this patent is extended or adjusted under 35 U.S.C. 154(b) by 383 days.

(21) Appl. No.: 12/375,977

(22) PCT Filed: Dec. 13, 2007

(86) PCT No.: PCT/JP2007/074006
§ 371 (c)(1),
(2), (4) Date: Feb. 2, 2009

(87) PCT Pub. No.: WO2008/078564
PCT Pub. Date: Jul. 3, 2008

(65) Prior Publication Data
US 2010/0005264 A1    Jan. 7, 2010

(30) Foreign Application Priority Data

Dec. 22, 2006   (JP) ................. 2006-346714

(51) Int. Cl.
*G06F 12/16* (2006.01)
(52) U.S. Cl. ................ 711/163; 711/E12.103; 710/269
(58) Field of Classification Search .................. None
See application file for complete search history.

(56) References Cited

U.S. PATENT DOCUMENTS

| | | |
|---|---|---|
| 2004/0210764 A1 | 10/2004 | McGrath et al. |
| 2005/0105738 A1 | 5/2005 | Hashimoto |
| 2005/0172294 A1 | 8/2005 | Kanemura et al. |
| 2008/0052534 A1 | 2/2008 | Harada et al. |

FOREIGN PATENT DOCUMENTS

| | | |
|---|---|---|
| EP | 1 209 563 | 5/2002 |
| JP | 2005-11336 | 1/2005 |
| JP | 2005-99984 | 4/2005 |
| WO | 03/085497 | 10/2003 |
| WO | 03/090074 | 10/2003 |
| WO | 2004/015553 | 2/2004 |
| WO | 2006/057316 | 6/2006 |
| WO | 2006/082990 | 8/2006 |

OTHER PUBLICATIONS

International Search Report issued Mar. 18, 2008 in the International (PCT) Application of which the present application is the U.S. National Stage.
Supplementary European Search Report issued Mar. 2, 2011 in corresponding European Patent Application No. 07850527.8.

*Primary Examiner* — Kevin Verbrugge
(74) *Attorney, Agent, or Firm* — Wenderoth, Lind & Ponack, L.L.P.

(57) ABSTRACT

To aim to provide an information processing device capable of improving a processing capability and securely handling programs and data to be protected. According to a system LSI including a plurality of CPUs, when a CPU-1 switches to a protection mode, the CPU-1 and a CPU-2 are reset. While the CPU-1 operates in the protection mode, only the CPU-1 executes a protection program and the CPU-2 is stopped by continuing outputting a reset signal to the CPU-2.

24 Claims, 9 Drawing Sheets

INFORMATION PROCESSING DEVICE FOR SECURELY PROCESSING DATA THAT NEEDS TO BE PROTECTED USING A SECURE MEMORY

TECHNICAL FIELD

The present invention relates to an art for securely handling programs and data that need to be protected, by using a device having a high processing capability.

BACKGROUND ART

In recent years, users have enjoyed listening to music by using consumer appliances capable of digitizing music data and storing the digitized music data in a storage device. Also, there have been demands for consumer appliances capable of handling high-quality contents such as HD images in addition to music data.

In order to process high-quality contents such as HD images, it is necessary to improve the processing capability of the consumer appliances. As a method of improving the processing capability of the consumer appliances, a multi CPU system (also referred to as a "multi processor system") has been used in the field of Personal Computers (PC). According to the multi CPU system, processing that has been conventionally performed by one CPU is shared among a plurality of CPUs so as to reduce a period necessary for performing the processing.

On the other hand, it is possible to make copies of digitized music data and HD images without deterioration. Accordingly, in order to protect interests of copyright holders of data such as digitized music data and HD images, it is necessary to handle the data in an environment where unauthorized use cannot be performed.

The Patent Document 1 discloses an art of preventing unauthorized use of data that needs to be protected, by using a device including a plurality of CPUs. According to the art disclosed in the Patent Document 1 (hereinafter referred to as a "first conventional art"), each of the plurality of CPUs has allocated thereto a key that is unique to the CPU. A program and data that need to be protected is encrypted using a key corresponding to a CPU among the CPUs that handles the program and data, and the encrypted program and data are stored in an external memory. When the CPU attempts to use the program and data stored in the external memory, a bus encryption circuit performs decryption processing using the key corresponding to the CPU, and outputs decrypted program and data to the CPU.

However, in a case where such a program and data include right information showing the permitted number of times of playing back contents for example, it is impossible to prevent a so-called backup restoration attack. The backup restoration attack is a kind of unauthorized use in which all the data stored in an external memory are copied, and a right is used up. Then, the copy of the right information is restored. In this case, the restored right information is accurately decrypted using the bus encryption circuit. This results in allowing restoration of the right that would have been expired. Therefore, the first conventional art cannot realize the secure handling of information that needs to be protected.

In view of this, in order to certainly protect data and programs, there has been conventionally used another art (hereinafter referred to as a "second conventional art") in which a device including one CPU (a single processor) performs operations by switching between processing relating to data that needs to be protected and processing relating to data that does not need to be protected.

The device of the second conventional art realizes an execution environment for performing processing relating to data that needs to be protected, by using an internal memory included in a system LSI and a mode dedicated for the CPU. Hereinafter, such an execution environment is referred to as a "protection mode". According to the second conventional art, while the system LSI is operating in a mode that is not the protection mode (hereinafter referred to as a "normal mode"), access to the internal memory by the system LSI is intercepted. Here, when the execution environment is switched from the normal mode to the protection mode, the CPU is reset. Then, a protected program stored in the system LSI is activated. This protected program is stored in a ROM or the like included in the system LSI, and is difficult to be tampered with from outside of the device. Also, when the execution environment is switched from the normal mode to the protection mode, the system LSI is permitted to access the internal memory. According to such a control, the system LSI cannot access the internal memory while operating in the normal mode. Furthermore, a program that can access the internal memory during operations of the system LSI in the protection mode is a program being operated by the CPU that is operating in the protection mode, and this program is difficult to be tampered with (or another program that is called by the program difficult to be tampered with). Therefore, it is possible to limit a program that can handle data stored in the internal memory to a secure program.

As described above, the device including one CPU switches between processing relating to data that needs to be protected and processing relating to data that does not need to be protected. Accordingly, it is possible to prevent unauthorized access to the secure memory and securely use data stored in the internal memory.

[Patent Document 1] Japanese Laid-Open Patent Application Publication No. 2005-99984

SUMMARY OF THE INVENTION

Problems the Invention is Going to Solve

According to the first conventional art, although the device has a high processing capability for processing high-quality contents such as HD images, it is impossible to prevent the backup restoration attack. Therefore, the first conventional art cannot realize the secure handling of information that needs to be protected.

On the other hand, according to the second conventional art, although the device can securely handle information that needs to be protected, the device has a low processing capability for processing high-quality contents such as HD images.

That is, neither the first conventional art nor the second conventional art can realize improvement in both the processing capability for processing high-quality contents such as HD images and the secure handling of programs and data that need to be protected.

In view of the above problem, the present invention aims to provide an information processing device, an integrated circuit, a method, and a program that are capable of improving the processing capability and securely handling programs and data that need to be protected.

Means to Solve the Problems

In order to achieve the above aim the present invention provides an information processing device that performs operations by switching between first processing relating to information that needs to be protected and second processing that is other than the first processing, the information processing device comprising: a secure memory operable to store therein the information that needs to be protected; a plurality of processors each operable to operate in accordance with a program; a bus that connects the plurality of processors with each other; and a control unit operable to, (i) in a first period for performing the first processing, permit at least one of the plurality of processors to access the secure memory via the bus, and perform one of (a) stopping operations of the others of the plurality of processors and (b) prohibiting the others of the plurality of the processors from accessing the secure memory via the bus, and (ii) in a second period for performing the second processing, prohibit all of the plurality of processors from accessing the secure memory via the bus.

Effect of the Invention

According to the information processing device having the above structure, in the first period, at least one of a plurality of processors is permitted to access the secure memory, and operations of the others of the plurality of processors are stopped or the others of the plurality of processors are prohibited from accessing the secure memory. Therefore, according to the information processing device, the others of the plurality of the processors cannot perform unauthorized access to the secure memory in the first period. Also, in the second period, since all of the plurality of processors are prohibited from accessing the secure memory, all of the plurality of processors cannot access the secure memory. That is, the information processing device can improve its processing capability by having a plurality of processors. Also, in the first period, the others of the plurality of the processors cannot use programs and data that need to be protected. In the second period, all of the plurality of processors cannot use the programs and data that need to be protected. Accordingly, the information processing device can securely handle programs and data that need to be protected.

Here, the control unit may include: a connection/disconnection subunit operable to connect between the secure memory and the bus in the first period, and disconnect between the secure memory and the bus in the second period; and an access control subunit operable to, in the first period, permit the at least one processor to access the secure memory, and stop the operations of the others of the plurality of the processors.

According to the information processing device having the above structure, in the first period, the secure memory and the bus are connected with each other, the at least one processor is permitted to access the secure memory, and the operations of the others of the plurality of processors are stopped. Therefore, according to the information processing device, the others of the plurality of the processors cannot perform unauthorized access to the secure memory in the first period. Also, since the secure memory and the bus are disconnected in the second period, it is possible to certainly prohibit all of the plurality of processors from accessing the secure memory in the second period.

Here, the access control subunit may stop the operations of the others of the plurality of the processors by continuing outputting reset signals to the others of the plurality of the processors.

According to the information processing device having the above structure, the access control subunit can stop the operations of the others of the plurality of the processors by continuing outputting reset signals to the others of the plurality of the processors. Accordingly, it is possible to structure the information processing device by using any conventional processor having the mechanism for processing reset signals without modifying the processor, and realize the information processing device with comparatively low costs.

Here, the information processing device may further comprise a switch unit operable to switch a reference destination address to be referred to by the at least one processor from another memory that is other than the secure memory to the secure memory, by designating, as an available interrupt vector, a first interrupt vector including an address that indicates a position within the secure memory instead of a second interrupt vector including an address that indicates a position within the another memory.

According to the information processing device having the above structure, the switch unit designates the first interrupt vector as an interrupt vector to be referred to by the at least one processor, instead of the second interrupt vector. Therefore, the at least one processor can certainly refer to the secure memory.

Here, when the second processing is switched to the first processing, any one of the plurality of processors may execute a switching program that includes an instruction to switch a reference destination address to be referred to by the at least one processor from another memory that is other than the secure memory to the secure memory, and the information processing device may further comprise a switch unit operable to switch the reference destination address of the at least one processor from the another memory to the secure memory in accordance with the instruction included in the executed switching program.

According to the information processing device having the above structure, by executing the switching program, it is possible to switch the reference destination address of the at least one processor such that the at least one processor can certainly refer to the secure memory in the first period.

Here, when the second processing is switched to the first processing, the access control subunit may save data of registers of all of the plurality of processors, and output reset signals to all of the plurality of processors after the data of the registers have been saved, and stop outputting the reset signal to the at least one processor after a predetermined period has elapsed.

According to the information processing device having the above structure, when the second processing is switched to the first processing, the reference destination address of the at least one processor is switched to the secure memory after the data of the registers of all of the plurality of processors has been saved. Therefore, it is possible to certainly hold the data of the registers, which has been used until immediately before switching of processing to be performed.

Here, after the first processing has been performed, the access control subunit may restore the saved data of the registers to all of the plurality of processors respectively, and stop outputting the reset signals to the others of the plurality of the processors, and before the access control subunit stops outputting the reset signals to the others of plurality of the processors, the switch unit may switch the reference destination address to be referred to by the at least one processor from the secure memory to the another memory by designating the second interrupt vector as an available vector instead of the first interrupt vector.

According to the information processing device having the above structure, when the first processing is switched to the second processing, the reference destination address of the at least one processor is switched from the secure memory to another memory. Accordingly, it is possible to prevent the at least one processor from referring to the secure memory. Furthermore, the data of the registers that has been saved is restored. Therefore, it is possible to certainly restore the saved data of the registers to states of the data of the registers which has been used until before switching of processing to be performed.

Here, the secure memory may store a protected program including a procedure for performing the first processing, and the information processing device may further comprise: a comparison unit operable to, when the second processing is switched to the first processing, compare a priority level of a program executed in the second period with a priority level of the protected program; and a switch unit operable to, if the priority level of the protected program is higher than the priority level of the program executed in the second period, switch a reference destination address to be referred to by the at least one processor from another memory that is other than the secure memory to the secure memory.

According to the information processing device having the above structure, when an important program is executed in the second period, the processor is not occupied with performing processing of the protected program that has a lower priority level than that of the important program. Accordingly, it is possible to perform processing of the important program in preference to processing of the protected program in the second period.

Here, the access control subunit may stop the others of the plurality of the processors, by controlling the others of the plurality of the processors to stop clock signals of the others of the plurality of the processors respectively.

According to the information processing device having the above structure, the access control subunit can stop the others of the plurality of the processors by controlling the others of the plurality of the processors to stop clock signals of the others of the plurality of the processors. Therefore, it is possible to structure the information processing device by using any conventional processor without modification, and realize the information processing device with comparatively low costs.

Here, the access control subunit may stop the others of the plurality of the processors by suspending supply of an electric power to the others of the plurality of the processors.

According to the information processing device having the above structure, the access control subunit can stop the others of the plurality of the processors by suspending supply of an electric power to the others of the plurality of the processors. Therefore, it is possible to structure the information processing device by using any conventional processor without modification, and realize the information processing device with comparatively low costs.

Here, the access control subunit may stop the others of the plurality of the processors, by controlling the others of the plurality of the processors to refer to an address in which an instruction is written, the instruction indicating to perform no processing.

According to the information processing device having the above structure, the access control subunit controls the others of the plurality of the processors to refer to an address in which an instruction to perform no processing is written. Therefore, it is possible to structure the information processing device by using any conventional processor without modification, and realize the information processing device with comparatively low costs.

Here, when the second processing is switched to the first processing, the access control subunit may control the at least one processor to refer to the secure memory by outputting a signal to the at least one processor, the signal being for instructing to switch a reference destination address to be referred to by the at least one processor from another memory that is other than the secure memory to the secure memory.

According to the information processing device having the above structure, it is possible to switch the reference destination address of the at least one processor from another memory to the secure memory.

Here, in the first period, the control unit may prohibit the at least one processor from accessing another memory that is other than the secure memory.

According to the information processing device having the above structure, it is possible to limit an access range of the at least one processor, which is permitted to access the secure memory in the first period, to the secure memory. Accordingly, even if an unauthorized program is stored in another memory that is other than the secure memory, the unauthorized program cannot be executed by the at least one processor that is performing the first processing. Therefore, it is possible to prevent unauthorized access by such an unauthorized program to the secure memory.

Here, the control unit may prohibit the at least one processor from accessing the another memory by disconnecting between the at least one processor and the another memory.

According to the information processing device having the above structure, in the first period, connection between the another memory and the at least one processor that is permitted to access the secure memory is disconnected. Therefore, it is possible to certainly limit the access range of the at least one processor to the secure memory.

Here, the control unit may disconnect between the another memory and the bus.

According to the information processing device having the above structure, in the first period, connection between the bus and the another memory is disconnected. Therefore, in the first period, it is possible to prohibit the others of the plurality of the processors, in addition to the at least one processor that is permitted to access the secure memory, from accessing the another memory.

Here, the plurality of processors may be identified by identifiers respectively unique to the plurality of processors, and the control unit may include: an identifier storage subunit operable to store a first identifier corresponding to the at least one processor in the first period; an acquisition subunit operable to acquire a second identifier corresponding to one processor among the plurality of processors that requests to access the secure memory; a comparison subunit operable to compare the second identifier with the first identifier; and an access judgment subunit operable to, if the second identifier does not match the first identifier, prohibit the processor that requests to access the secure memory from accessing the secure memory, and if the second identifier matches the first identifier, permit the processor that requests to access the secure memory to access the secure memory.

According to the information processing device having the above structure, the control unit stores the first identifier identifying the at least one processor that is permitted to access the secure memory in the first period. Therefore, it is possible to judge whether a processor that requests to access the secure memory is a processor that is performing the first processing. This can prevent a processor that is prohibited to access the secure memory from accessing the secure memory.

Here, the at least one processor may include a switch unit operable to, when the second processing is switched to the first processing, switch a reference destination address to be referred to by the at least one processor from another memory that is other than the secure memory to the secure memory, and output the first identifier corresponding to the at least one processor to the control unit, and upon receiving the first identifier from the switch unit included in the at least one processor, the control unit may store the received first identifier in the identifier storage subunit, and when the first processing is switched to the second processing, the control unit may delete the first identifier from the identifier storage subunit.

According to the information processing device having the above structure, when the first processing is switched to the second processing, the stored first identifier corresponding to the at least one processor that is permitted to access the secure memory is deleted from the identifier storage subunit. Therefore, it is possible, in the second period, to prohibit the at least one processor from accessing the secure memory.

Here, when one of the plurality of processors outputs to the control unit an access request for accessing the secure memory, the one of the plurality of processors may output, to the control unit, processing information indicating whether the processor is performing the first processing with the access request, and if the processing information indicates that the one processor of the plurality of processors is performing the first processing, the control unit may permit the one processor to access the secure memory, and if the processing information indicates that the one processor of the plurality of processors is not performing the first processing, the control unit may prohibit the one processor from accessing the secure memory.

According to the information processing device having the above structure, if the processing information indicates that the one processor of the plurality of processors is performing the first processing, the control unit permits the one processor to access the secure memory. Therefore, it is possible to prevent unauthorized access by a processor that is not performing the first processing to the secure memory.

Here, each of the plurality of processors may include: an information storage unit operable to store the processing information; and a switch unit operable to, when the second processing is switched to the first processing, switch a reference destination address to be referred to by the processor from another memory that is other than the secure memory to the secure memory, and change the processing information stored in the information storage unit to indicate that the first processing is performed.

According to the information processing device having the above structure, the switch unit included in each of the plurality of processors can certainly switch a reference destination address of the processor, and also can change processing information corresponding to the processor stored in the information storage unit so as to indicate that the first processing is performed.

DESCRIPTION OF CHARACTERS

Figure 1:
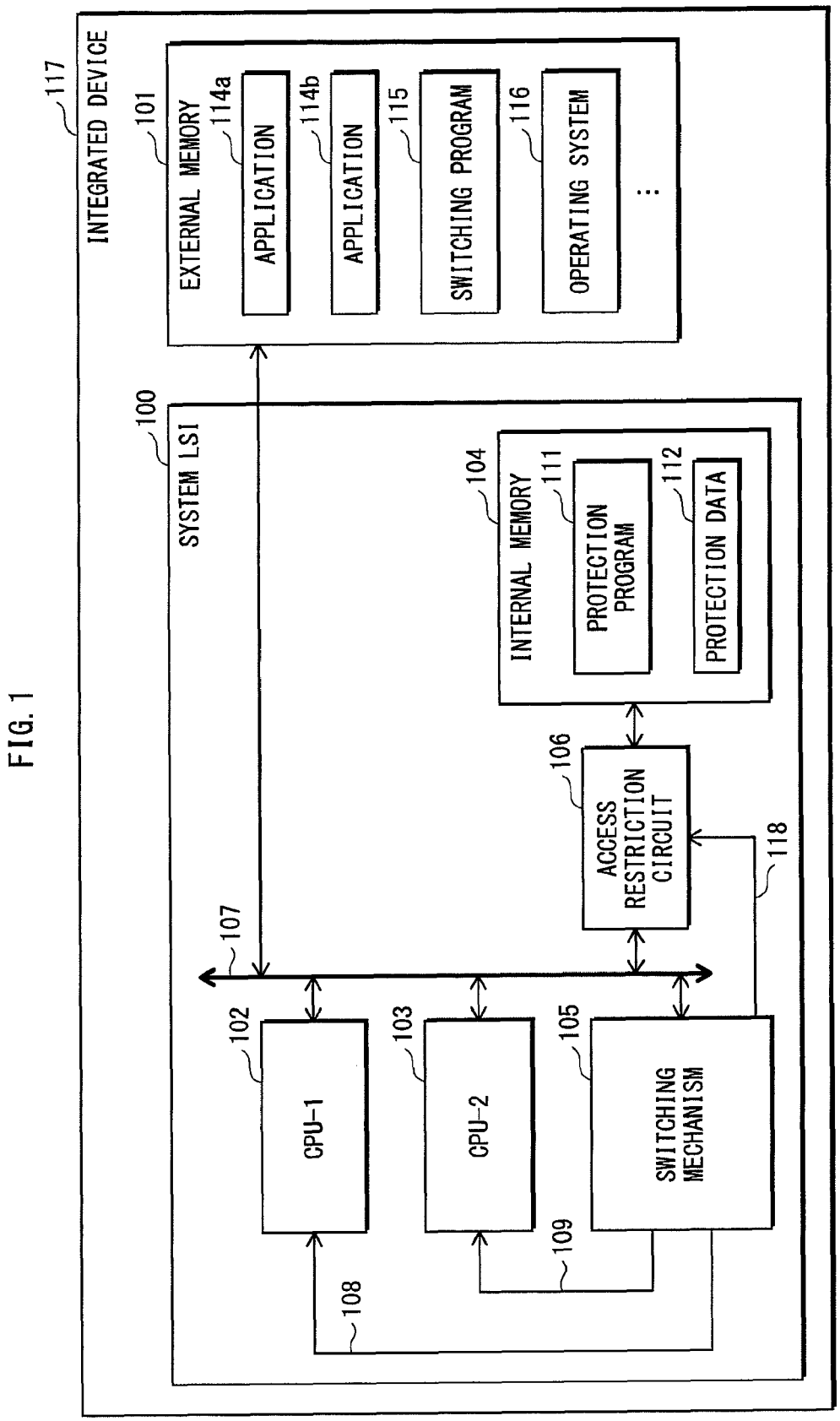
FIG. 1 is a block diagram showing the hardware structure of an integrated device 117 according to a first embodiment.

100: system LSI
101: external memory
102: CPU-1
103: CPU-2
104: internal memory
105: switching mechanism
106: access restriction circuit
107: internal bus
110: bank switching unit
117: integrated device
121: switching register
122: signal output unit
123: normal mode interrupt vector
124: protection mode interrupt vector
125: CPU register saving/restoration unit

DETAILED DESCRIPTION OF THE INVENTION

1. First Embodiment

The following describes a first embodiment of the present invention with reference to the drawings.

1.1 Outline

An integrated device 117 according to the first embodiment includes, as shown in FIG. 1, a system LSI 100 and an external memory 101. The system LSI 100 includes a plurality of CPUs (a CPU-1 102 and a CPU-2 103 are used here), a tamper-resistant internal memory 104, a switching mechanism 105, and an access restriction circuit 106.

The following description is provided based on the assumption that the integrated device 117 is, for example, a portable consumer appliance that records and plays back music data and the like that is data that needs to be protected.

The integrated device 117 is a device that performs processing relating to data that needs to be protected (hereinafter "protection data") using the internal memory 104 included in the system LSI 100. The protection data is, for example, right information relating to playback and copy of music contents, decryption key data, or the like. A CPU for processing the protection data switches to a mode realized by an internal memory included in the system LSI and a dedicated mode for the CPU, and performs necessary processing. Hereinafter, the realized mode is referred to as "protection mode". Compared to this, a mode other than the protection mode is referred to as "normal mode". The integrated device 117 prohibits a CPU operating in the normal mode from accessing the internal memory 104 by stopping a CPU other than the CPU that has switched to the protection mode.

Immediately after being activated and immediately after being initialized, the CPUs included in the system LSI 100 each operate in the normal mode. Also, for simplification of description, the following setup is performed in the first embodiment: when the integrated device 117 processes protection data, the CPU-1 102 switches to the protection mode and performs processing that needs to be protected (hereinafter "protection processing"); and while the CPU-1 102 operates in the protection mode, the CPU-2 103 stops.

The following describes the outline of the integrated device 117 by describing the outline of compositional elements thereof. The more detailed description thereof is provided later for each of the compositional elements.

The system LSI 100 plays back music data that is read from an external flash memory (not shown) or the like. A procedure for playing back music data is described in applications 114a and 114b. Here, in the first embodiment, music data stored in the external flash memory has been encrypted, and the applications 114a and 114b each request a protection program 111 to perform processing that needs to be confidential (processing that needs to be protected) via a switching program 115. The processing that needs to be confidential is, for example, decryption of encrypted music data, generation of decryption keys, and check of a permitted period of playing back music data or a permitted number of times of playing back music data. Upon receiving the request from the application 114, the protection program 111 performs the above processing that needs to be confidential using the internal memory 104, which is included in the system LSI 100, and to which access from outside is difficult. This processing is realized by the CPU-1 that has switched to the protection mode executing the protection program 111. While the CPU-1 executes the protection program 111, the CPU-2 is stopped. Accordingly, the integrated device 117 can securely perform processing relating to decryption and playback of music data.

The external memory 101 is a memory provided outside of the system LSI 100, and is used for executing a program that has a comparatively low degree of security importance. Note that, in the first embodiment, this external memory 101 has a large capacity, and does not have any special mechanism for preventing unauthorized access. However, it may be of course possible to structure the external memory 101 to have some mechanism for preventing unauthorized access.

1.2 Structure

The following describes the details of compositional elements of the integrated device 117.

Although not shown in FIG. 1, the integrated device 117 normally further includes an input/output unit for receiving input and output from a user, a removable interface for accessing an external memory, an audio output mechanism, and so on. These elements are not essential to the present invention, and accordingly descriptions thereof are omitted here.

<Explanation of System LSI 100>

The CPU-1 102, the CPU-2 103, the switching mechanism 105, and the access restriction circuit 106 that are included in the system LSI 100 are connected with each other via an internal bus 107. Furthermore, the internal memory 104 is connected with the access restriction circuit 106 via a dedicated line.

In the first embodiment, since the internal memory 104 is connected with the access restriction circuit 106 via the dedicated line, the CPUs cannot access the internal memory 104 using only the internal bus 107 without using the access restriction circuit 106.

Accordingly, it is possible to prevent data stored in the internal memory 104 from being stolen by the CPU or the like that is not permitted to access the internal memory 104 by the access restriction circuit 106.

(1) CPU-1 102 and CPU-2 103

The CPU-1 102 and the CPU-2 103 each control the whole operations of the system LSI 100 and the whole operations of the integrated device 117 by decoding and executing an instruction code included in a program stored in the external memory 101 or the internal memory 104. The CPU-1 102 and the CPU-2 103 each perform no operation while receiving a reset signal, which is described later. Also, after receiving the reset signal, the CPU-1 102 and the CPU-2 103 each restart controlling the system LSI 100 and the integrated device 117 by referring to a reset interruption included in an interrupt vector, which is described later. The reset interruption indicates a head address in a memory region that stores a handler (program) to be executed immediately after cancellation of the reset signal.

(2) Internal Memory 104

The internal memory 104 includes a RAM, a ROM, and so on. As shown in FIG. 1, the internal memory 104 stores therein the protection program 111 and the protection data 112.

The protection program 111 stored in the internal memory 104 is a group of programs to be executed by the CPU-1 102 operating in the protection mode. Specifically, the protection program 111 is an operating system for the protection mode, an application program for handling the protection data 112 in the protection mode, and the like. Each of the programs constituting the protection program 111 perform, independently or in association with other program as necessary, protection processing such as decryption of encrypted music data, generation of decryption keys, and check of right information appertaining to music data. After completing the protection processing, the protection program 111 writes a value "0" indicating the normal mode into a switching register 121 (described later) included in the switching mechanism 105.

The protection data 112 is data that needs to be protected against unauthorized access, and is for example music data decrypted by the protection program 111, right information such as the permitted number of times of playing back music data, and a decryption key to be used for decrypting music data.

For simplification of description, FIG. 1 shows that the protection program 111 and the protection data 112 have been already stored in the internal memory 104. Alternatively, the program and data may be stored in the internal memory 104 immediately after the system LSI 100 is activated, or stored further later as necessary. In this case, in order to prevent tampering from outside the integrated device 117, the program and data are originally recorded in a tamper-resistant ROM (not shown) or a recording region having some security mechanism that is included in the system LSI 100. When the system LSI 100 is activated, or when execution of the protection program 111 starts, the program and data are stored in the internal memory 104.

(3) Switching Mechanism 105

As shown in FIG. 1, the switching mechanism 105 is connected with the CPU-1 102 and the CPU-2 103 respectively via a signal line 108 and a signal line 109. Also, the switching mechanism 105 is connected with the access restriction circuit 106 via a signal line 118.

Figure 2:
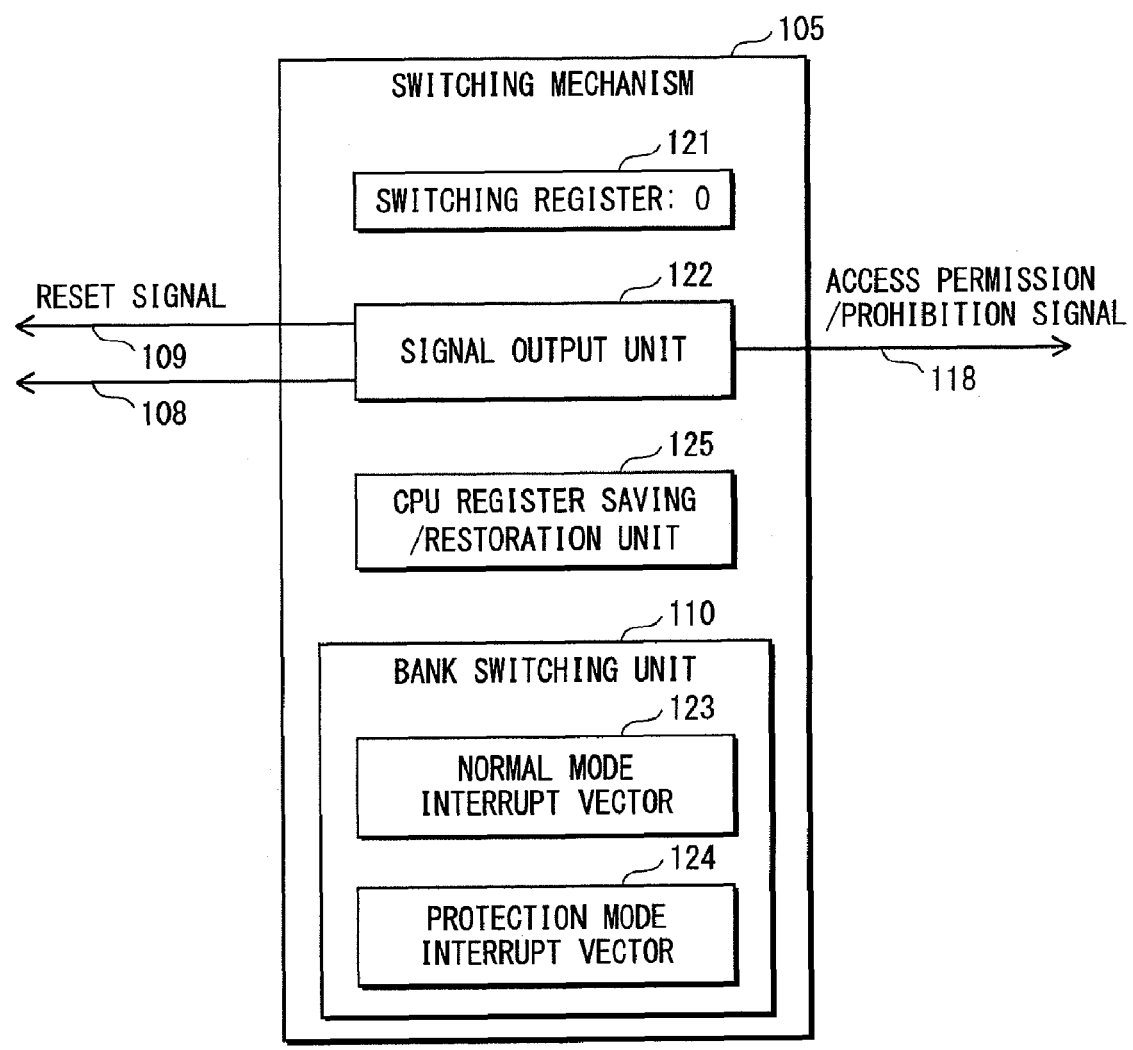
FIG. 2 is a block diagram showing the details of a switching mechanism 105.

FIG. 2 is a block diagram showing the detailed structure of the switching mechanism 105. As shown in FIG. 2, the switching mechanism 105 includes a switching register 121, a signal output unit 122, a CPU register saving/restoration unit 125, and a bank switching unit 110. The switching mechanism 105 is structured so as to switch the two CPU between the operation modes.

(3-1) Switching Register 121

The switching register 121 is a register capable of storing therein data having several bits, which indicates a status of the CPU-1 102. For example, the switching register 121 stores therein data "0" indicating the normal mode and data "1" indicating the protection mode.

(3-2) CPU Register Saving/Restoration Unit 125

In accordance with an instruction by the switching program 115, the CPU register saving/restoration unit 125 saves data stored in registers respectively included in the CPU-1 102 and the CPU-2 103 (hereinafter, referred to as "register contents") and data being processed to the external memory 101, and restores the saved register contents and the like to the corresponding CPUs.

Also, the CPU register saving/restoration unit 125 stores therein in advance a restoration address, which indicates a predetermined position within a region of the external memory 101 in which the switching program 115 is stored. In the switching program 115, positions subsequent to the position indicated by the restoration address include a procedure for restoring saved register contents to the CPUs and a procedure for notifying the application 114 of a result of processing performed by the protection program 111.

The CPU register saving/restoration unit 125 stores therein in advance the restoration address. Alternatively, the switching program 115 may notify the CPU register saving/restoration unit 125 of the restoration address together with an instruction to save the register contents of the CPUs.

Also, when the CPU-1 102 switches from the protection mode to the normal mode, the CPU register saving/restoration unit 125 writes the above restoration address into a program counter of the CPU-1 102 via the internal bus 107, in accordance with an instruction by the signal output unit 122.

Also, in accordance with an instruction by the switching program 115, the register saving/restoration unit 125 restores saved register contents to the CPUs.

(3-3) Signal Output Unit 122

The signal output unit 122 always monitors a value stored in a register of the switching register 121.

When a value "1" is written into the switching register 121, the signal output unit 122 outputs reset signals to the CPU-1 102 and the CPU-2 103 respectively via the signal lines 108 and 109. This initializes register values of the two CPUs.

After a predetermined period has elapsed, the signal output unit 122 cancels the reset signal over the CPU-1 102, and continues outputting the reset signal to the CPU-2 103.

Also, the signal output unit 122 outputs an access permission signal to the access restriction circuit 106.

Furthermore, when a value "0" is written into the switching register 121, the signal output unit 122 instructs the CPU register saving/restoration unit 125 to write a restoration address.

Next, the signal output unit 122 outputs an access prohibition signal to the access restriction circuit 106, and then cancels the reset signal over the CPU-2 203.

Figure 3:
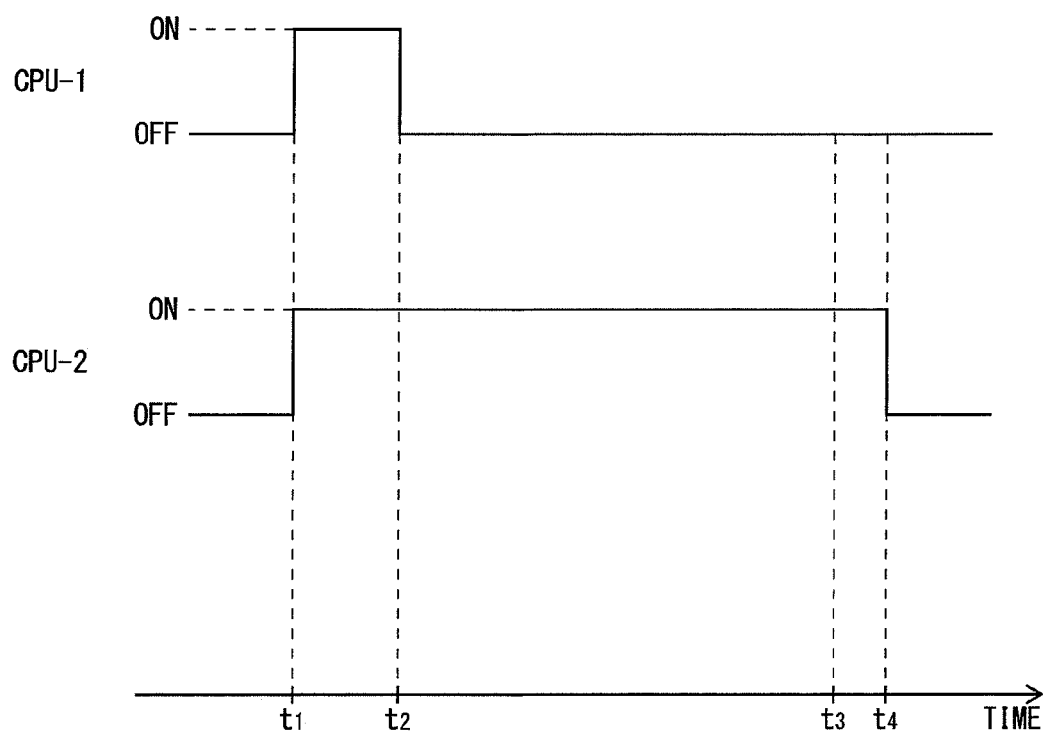
FIG. 3 shows the correspondence between reset signals to be output to CPUs and time lapse.

FIG. 3 shows the correspondence between time lapse and output of reset signals to the CPUs. The following describes the time lapse, and operations of outputting reset signals and stopping the output performed by the signal output unit 122 with reference to FIG. 3.

At a time t1, a value "1" is written into the switching register 121, and the signal output unit 122 starts outputting reset signals to the CPU-1 102 and the CPU-2 103.

At a time t2, the signal output unit 122 outputs an access permission signal to the access restriction circuit 106, and also cancels the reset signal over the CPU-1 102. However, the signal output unit 122 continues outputting the reset signal to the CPU-2 103.

At a time t3, a value "0" is written into the switching register 121, and the signal output unit 122 outputs an access prohibition signal to the access restriction circuit 106. Then, at a time t4, the signal output unit 122 stops outputting the reset signal to the CPU-2 103.

(3-4) Bank Switching Unit 110

As shown in FIG. 2, the bank switching unit 110 stores therein two types of interrupt vectors.

These interrupt vectors are recorded at the time of manufacturing the integrated device 117, and cannot be tampered with after sales of the device.

For each type of interruption, the normal mode interrupt vector 123 includes an address at which a handler is stored that operates in a case where an interruption occurs. Here, each of the addresses included in the normal mode interrupt vector 123 indicates a position of a different one of memories among the external memory 101 and memories included in the integrated device 117 (also including a memory not shown).

Similarly, the protection mode interrupt vector 124 includes, for each type of interruption, an address at which a handler that operates in a case where an interruption occurs is stored. Each of the addresses included in the protection mode interrupt vector 124 indicates a different position within the internal memory 104.

Especially, the reset interruption included in the protection mode interrupt vector 124 is an address that indicates a head in a region of the internal memory 104 in which the protection program 111 is stored.

When the integrated device 117 is activated, the bank switching unit 110 specifies the normal mode interrupt vector 123 as an available interrupt vector.

When an access permission signal is output by the signal output unit 122, the bank switching unit 110 specifies the protection mode interrupt vector 124 as an available interrupt vector, instead of the normal mode interrupt vector 123.

Also, when an access prohibition signal is output by the signal output unit 122, the bank switching unit 110 specifies the normal mode interrupt vector 123 as an available interrupt vector.

It is possible to specify an interrupt vector in an arbitrary manner. For example, it may be employed to turn a flag at a head of one available of the two interrupt vectors.

Accordingly, when an interruption occurs, the CPU-1 102 and the CPU-2 103 each perform interruption processing with reference to one available of the two interrupt vectors.

(4) Access Restriction Circuit 106

The access restriction circuit 106 is connected with the signal output unit 122 included in the switching mechanism 105 via the signal line 118, and receives an access permission signal and an access prohibition signal.

Upon receiving the access permission signal, the access restriction circuit 106 connects the internal bus 107 with the internal memory 104. Upon receiving the access prohibition signal, the access restriction circuit 106 disconnects between the internal bus 107 and the internal memory 104.

Note that when the integrated device 117 is activated, the access restriction circuit 106 disconnects between the internal bus 107 and the internal memory 104.

(5) Conclusion of Structure of System LSI 100

With the above-described structure, when attempting to perform processing that does not need to be protected, the two CPUs operating in the normal mode each do not refer to data stored in the internal memory 104. Also, when attempting to perform protection processing, the CPU-1 102 operating in the protection mode performs the protection processing by referring to data and programs stored in the internal memory 104. The performance of the protection processing completes within the system LSI 100. Accordingly, even if an unauthorized program is stored outside of the system LSI 100, this unauthorized program cannot be executed.

Also, while the CPU-1 102 operates in the protection mode, the switching mechanism 105 stops operations of the CPU-2 103 by continuing outputting the reset signal to the CPU-2 103. Accordingly, the CPU-2 103 cannot perform any processing while the system LSI 100 operates in the protection mode. As a result, the CPU-2 103 cannot read a malicious program written into the external memory, and accordingly cannot steal data stored in the internal memory 104.

Furthermore, when switching the CPU-1 102 from the protection mode to the normal mode, the switching mechanism 105 writes a restoration address described above into the program counter of the CPU-1 102, cancels the reset signal over the CPU-2 103, and notifies the access restriction circuit 106 of an access prohibition signal.

Furthermore, when the operation mode is switched between the normal mode and the protection mode, the bank switching unit 110 switches between the interrupt vectors such that the switched interrupt vector corresponds to the switched operation mode. Accordingly, when an interruption occurs, the CPU operating in the normal mode does not refer to the internal memory 104. Also, the CPU operating in the protection mode does not refer to the external memory 101 or the like, but refers to the internal memory 104.

Accordingly, if an unauthorized program is stored in the external memory 101 or the like, the unauthorized program is not executed while the system LSI 100 operates in the protection mode. Therefore, it is difficult to tamper with or steal data and programs stored in the internal memory 104 by executing the unauthorized program.

<Description of Compositional Elements Other than System LSI 100>

The following describes other compositional elements of the integrated device 117.

The external memory 101 includes a RAM and a ROM. The external memory 101 stores therein, as shown in FIG. 1, the application 114a, the application 114b, the switching program 115, and the operating system 116, for example. Note that these programs may be stored in the external memory 101 when the system LSI 100 is activated. Alternatively, it may be possible to read these programs as necessary from other recording media such as a ROM and an HDD, and store the read programs in the external memory 101.

Also, although not shown in the drawings, the external memory 101 stores therein other programs, data to be used for the programs, and so on.

(1) Applications 114a and 114b

The applications 114a and 114b are each a program for controlling whole the integrated device 117. In the first embodiment, the applications 114a and 114b each include a procedure for acquiring music data from a flash memory or the like (not shown), and performing playback and copy of the acquired music data. These two applications 114a and 114b each include a procedure for playing back music data in a different data format. Hereinafter, in a case where there is no particular necessity for distinguishing between the applications 114a and 114b, these applications are simply referred to as "application 114".

The application 114 includes a procedure for requesting the protection program 111 to perform protection processing via the switching program 115.

The application 114 is referred to and executed by the CPU-1 102 or the CPU-2 103 as necessary. The application 114 has a comparatively low degree of security importance. Also, the application 114 has a large size for controlling whole the integrated device 117. Accordingly, the application 114 is not stored in the internal memory 104 having a limited storage size but is stored in the external memory 101.

(2) Switching Program 115

The switching program 115 is a program that includes a procedure for controlling the switching mechanism 105 to start switching the operation mode of the CPUs included in the system LSI 100.

Specifically, the switching program 115 includes a procedure for writing a value "1" into the switching register 121 included in the switching mechanism 105 upon receiving a call from the application 114.

Also, as described above, in the switching program 115, positions subsequent to the position indicated by the restoration address include a procedure for restoring saved register contents of the CPUs to the respective CPUs and a procedure for notifying the application 114 of a result of processing performed by the protection program 111.

The switching program 115 needs to receive a request irregularly made by other programs. Accordingly, while all of the CPUs included in the system LSI 100 are operating in the normal mode, the switching program 115 of the first embodiment continues operating in the CPU-1 102 in the background.

(3) Operating System 116

The operating system 116 is a program that provides the application 114 and the like with an operation environment. Note that the operating system 116 is also referred to as a basic soft, an operation system, or an OS.

1.3 Operations (1) Operations of Integrated Device 117

Here, the operations of the integrated device 117 are described with reference to a flow chart shown in FIG. 4.

When the integrated device 117 is turned ON by a user's operation, the integrated device 117 is activated.

When the integrated device 117 is activated, an electric power is supplied to the system LSI 100 (Step S100).

When the system LSI 100 is activated, the operating system 116 is activated (Step S101). The operating system 116 activates the application 114, the switching program 115, and the like. In the first embodiment, until receiving a call from the application 114, the switching program 115 stands by in the CPU-1 102 (Step S102).

Here, when the user instructs the integrated device 117 to play back music by making an input with a button (not shown) for example, the application 114 requests the switching program 115 to call the protection program 111 in order to perform protection processing relating to playback of the music (Step S103).

Upon receiving the request by the application 114, the switching program 115 instructs the switching mechanism 105 to save register contents of the CPUs.

Upon receiving this instruction, the CPU register saving/restoration unit 125 of the switching mechanism 105 saves, to the external memory 101, register contents of the CPU-1 102 and the CPU-2 103 and data being processed (Step S104).

Next, under control of the switching program 115, the switching mechanism 105 switches the CPU-1 102 to the protection mode, and stops the CPU-2 103 (Step S105). Switching of the operation mode to the protection mode is described in detail later.

Then, the CPU-1 102 that has switched to the protection mode executes the protection program 111 (Step S106). Subsequently, the protection program 111 performs, in association with other programs as necessary, check of the permitted number of times of playing back music data, for example. If the music data is playable, the protection program 111 performs processing such as decryption of encrypted music data. These check processing and decryption processing are not essential to the present invention, and accordingly the descriptions thereof are omitted. Note that while the protection program 111 performs the above processing, the switching mechanism 105 continues outputting the reset signal to the CPU-2 103, and accordingly the CPU-2 103 performs no operation.

When completing the requested processing, the protection program 111 writes a value "0" into the switching register of the switching mechanism 105. In accordance with this timing, the CPU-1 102 switches to the normal mode (Step S107). Processing of switching the operation mode from the protection mode to the normal mode is described in detail later.

The CPU-1 102 that has switched to the normal mode restarts executing the switching program 115. The switching program 115 instructs the switching mechanism 105 to restore the register contents of the two CPUs to the CPUs.

Upon receiving the instruction, the CPU register saving/restoration unit 125 of the switching mechanism 105 restores the register contents, which have been saved to the external memory 101, to the CPU-1 102 and the CPU-2 103, respectively (Step S108).

Then, the switching program 115 notifies the application 114 of a result of the processing performed by the protection program 111 (Step S109).

In accordance with the result of the processing and a user's operation, the application 114 continues performing processing such as playback of music (Step S110).

(2) Operations of Switching to Protection Mode

Figure 4:
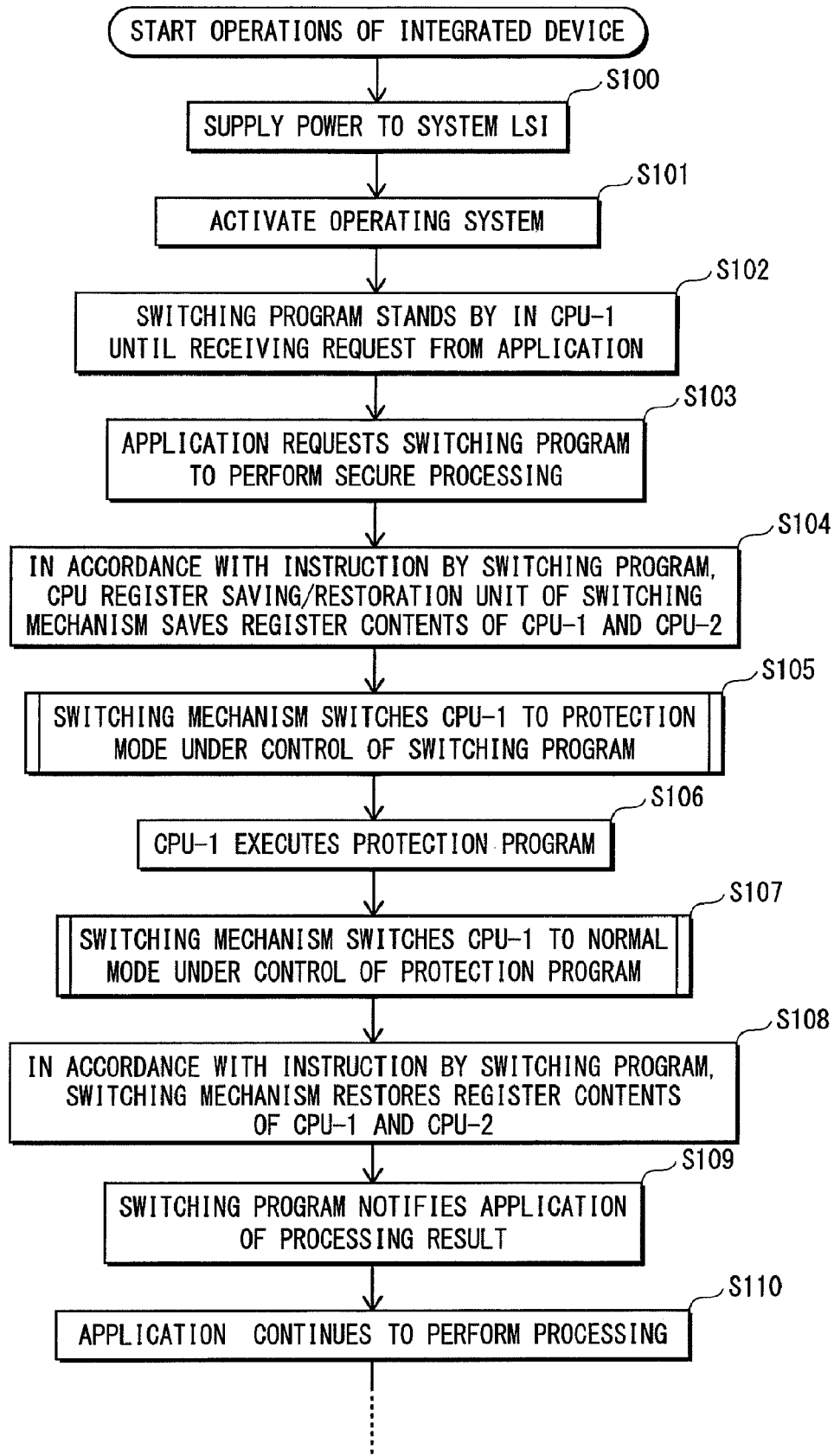
FIG. 4 is a flow chart of operations of the integrated device 117 according to the first embodiment.

In the operation of switching the CPU the to protection mode performed in Step S105 of the FIG. 4, when the application 114 requests the switching program 115 to perform protection processing, the switching program 115 controls the switching mechanism 105 to switch the CPU-1 102 from the normal mode to the protection mode and to stop the CPU-2 103.

Figure 5:
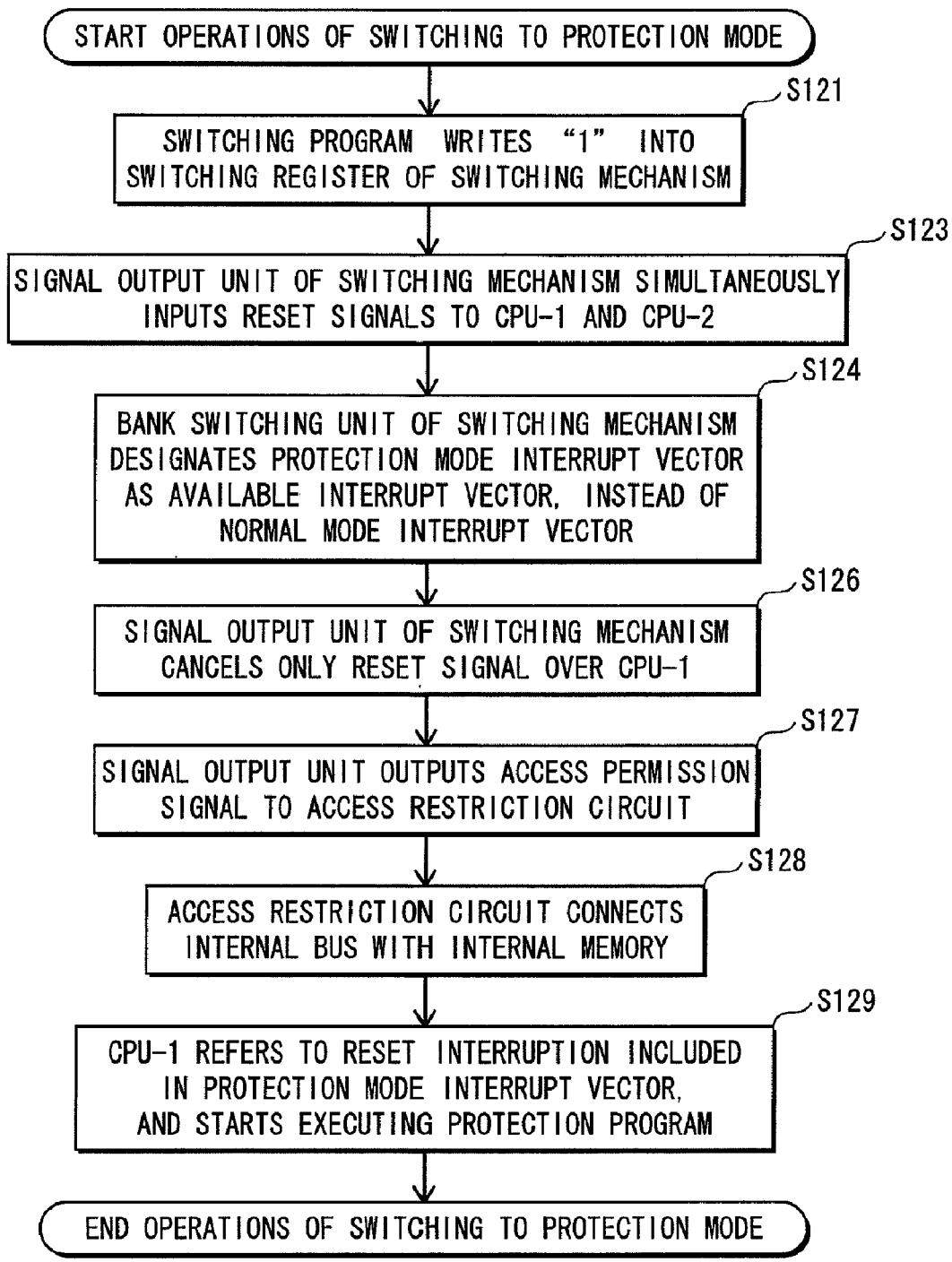
FIG. 5 is a flow chart of operations of switching an operation mode to a protection mode, which shows the details of Step S105 of FIG. 4.

The following describes in detail the operations of the system LSI 100 that relates to switching to the protection mode with reference to a flow chart shown in FIG. 5.

The switching program 115 writes a value "1" into the switching register 121 of the switching mechanism 105 (Step S121).

When detecting that the value "1" has been written into the switching register 121, the signal output unit 122 of the switching mechanism 105 inputs reset signals to the CPU-1 102 and the CPU-2 103 via the signal lines 108 and 109, respectively (Step S123).

Then, the bank switching unit 110 of the switching mechanism 105 designates the protection mode interrupt vector 124 as an available interrupt vector, instead of the normal mode interrupt vector 123 (Step S124).

When switching between the interrupt vectors completes (Step S124), the signal output unit 122 cancels the reset signal over the CPU-1 102 (Step S126). This operation enables the CPU-1 102 to operate.

Also, while canceling the reset signal over the CPU-1 102, the signal output unit 122 outputs an access permission signal to the access restriction circuit 106 via the signal line 118 (Step S127).

Upon receiving the access permission signal, the access restriction circuit 106 connects the internal bus 107 with the internal memory 104 (Step S128).

Since the reset signal over the CPU-1 102 is canceled, the CPU-1 102 refers to the reset interruption included in the protection mode interrupt vector 124, and starts executing the protection program 111 stored in the internal memory 104 (Step S129).

(3) Operations of Switching to Normal Mode

The operation of switching the CPU to the normal mode in Step S107 of FIG. 4 starts when execution of the protection program 111 needs to be suspended or terminated. For example, the switching operation starts when the protection program 111 completes processing that needs to be protected, or when processing for the normal mode that needs to be prioritized over execution of the protection program 111, such as a user's key input, is performed.

Figure 6:
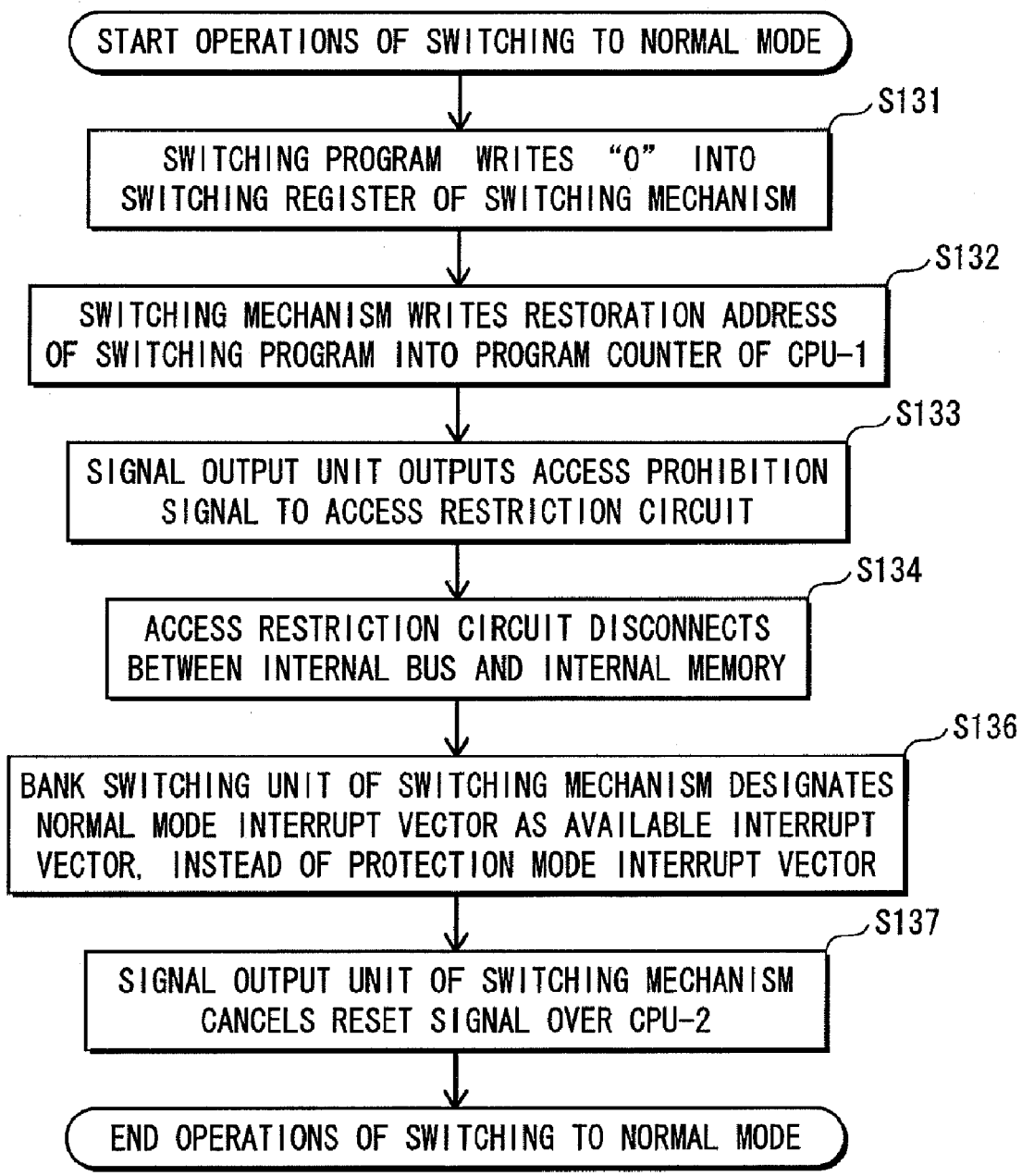
FIG. 6 is a flow chart of operations of switching the operation mode to a normal mode, which shows the details of Step S107 of FIG. 4.

The following describes the operations of the system LSI 100 that relates to switching to the normal mode, with reference to a flow chart shown in FIG. 6.

The protection program 111 that is being executed by the CPU-1 102 writes a value "0" into the switching register 121 of the switching mechanism 105 (Step S131).

Upon detecting that the value "0" has been written into the switching register 121, the signal output unit 122 of the switching mechanism 105 instructs the CPU register saving/restoration unit 125 to set a restoration address. The CPU register saving/restoration unit 125 writes the restoration address stored therein into the program counter of the CPU-1 102 (Step S132).

Then, the signal output unit 122 outputs an access prohibition signal to the access restriction circuit 106 (Step S133).

Upon receiving the access prohibition signal, the access restriction circuit 106 disconnects between the internal bus 107 and the internal memory 104 (Step S134).

Also, the bank switching unit 110 of the switching mechanism 105 designates the normal mode interrupt vector 123 as an available interrupt vector, instead of the protection mode interrupt vector 124 (Step S136). This operation restores the interrupt vector to the interrupt vector that has been used till the operation mode has switched to the protection mode.

When switching between the interrupt vectors completes (Step S136), the signal output unit 122 cancels the reset signal over the CPU-2 103 (Step S137). This operation enables the CPU-2 103, which has stopped while the CPU-1 102 has been operating in the protection mode, to restart operations.

In a case where restoration processing is performed by suspending operations of the protection program 111 operating in the protection mode, for example in a case where a user's input is received while music is being played back, the CPU register saving/restoration unit 125 stores, in the internal memory 104, register contents of the CPU-1 102 and data being processed, till Step S132 completes at the latest. Then, when the operation of the protection program 111 restarts, the CPU register saving/restoration unit 125 restores the register contents of the CPU-1 102 and the data being processed that are stored in the internal memory 104 to the CPU-1 102. This enables the protection program 111 to restart operations.

1.4 Conclusion

As described above, according to the integrated device 117 of the first embodiment, when the CPU-1 102 included in the system LSI 100 switches to the protection mode, only the CPU-1 102 in the protection mode is operated, and the CPU-2 103 that is other CPU is stopped by continuing outputting a reset signal to the CPU-2 103. Accordingly, while the CPU-1 102 operating in the protection mode performs processing that needs to be protected using the internal memory 104, the CPU-2 103 cannot perform any operation. This can reduce the risk of steal of the protection program 111 and the protection data 112 stored in the internal memory 104. In other words, even if an unauthorized program for acquiring or writing data stored in the internal memory 104 is written into the external memory 101 so as to cause the CPU-2 103 to execute the unauthorized program, the CPU-2 103 cannot perform any operation. Therefore, it is possible to securely perform processing relating to the protection program 111 and the protection data 112 even in the multi CPU environment.

Also, the signal output unit 122 continues outputting a reset signal to the CPU-2 103 in order to stop operations of the CPU-2 103. Accordingly, it is possible to create the system by using any conventional CPU having the structure for processing reset signals without modification, and realize the system with a comparatively low cost.

In the first embodiment, only the CPU-1 102 operates in the protection mode. Alternatively, it may be of course possible to set that only the CPU-2 103 operates in the protection mode. That is, since it is only necessary to cause a CPU that has switched to the protection mode to be operable, it may be possible to determine which CPU is to be operable and which CPU is to be stopped in accordance with the processing stats of the integrated device 117 at different times. Specifically, the processing status of the integrated device 117 for example shows which CPU has a higher load at a time of starting switching of the CPU operation mode from the normal mode to the protection mode. Alternatively, in a case where the CPU-1 102 and the CPU-2 103 each have a different architecture or processing capability, it may be employed to judge which CPU is appropriate to perform protection processing when the protection processing needs to be performed, and cause only a CPU judged to be more appropriate to be operable. Also, in such a case, a CPU for restarting execution of the protection program 111 that has been suspended does not necessarily need to be the CPU-1 102. That is, in a case where the CPU-2 103 has the same functions as the CPU-1 102 and can execute the protection program 111, when execution of the protection program 111 is restarted, it may be employed to restore the operation mode of the CPU-1 102, and cause the CPU-2 103 to restart execution of the protection program 111.

Furthermore, a CPU that has switched from the normal mode to the protection mode does not necessarily need to be a CPU that restarts performing processing for the normal mode at the time of end of the protection mode. This modification can be realized by the CPU register saving/restoration unit 125 restoring data and register contents, which have been saved to the external memory 101, to a CPU other than a CPU from which the register contents have been saved.

It may be of course possible to determine in advance one CPU as a CPU for operating in the protection mode, and determine in advance the other CPU as a CPU that is not permitted to operate in the protection mode.

2. Second Embodiment

The following describes a second embodiment of the present invention with reference to the drawings. Note that the description of the structure of the second embodiment that is the same as that of the first embodiment is omitted here, and characteristics of the second embodiment are mainly described.

2.1 Structure

Figure 7:
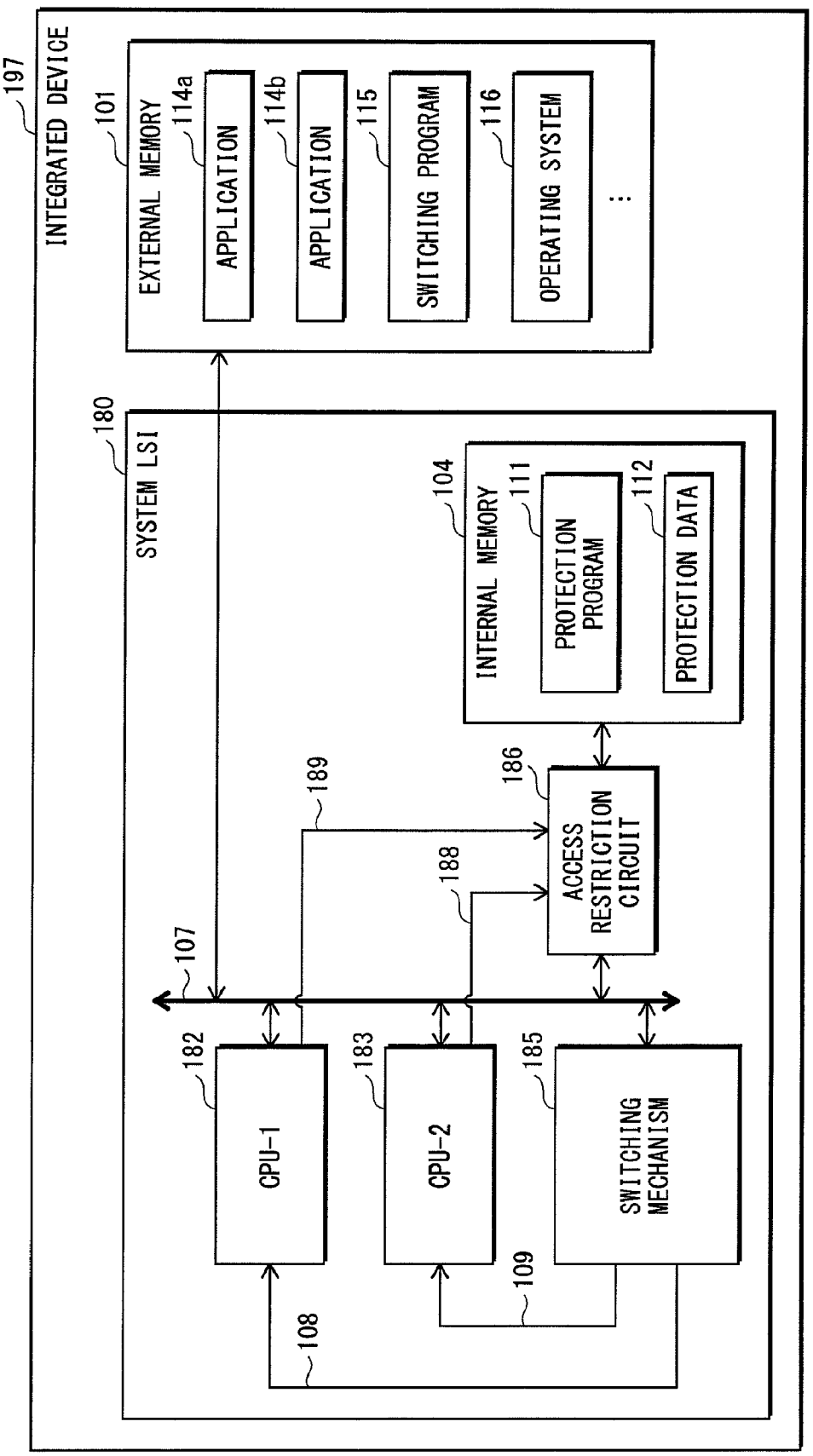
FIG. 7 is a block diagram showing the hardware structure of an integrated device 197 according to a second embodiment.

FIG. 7 is a block diagram showing the hardware structure of an integrated device 197 according to the second embodiment of the present invention. Note that compositional elements of the integrated device 197 having the same structures as those of the first embodiment are denoted with the same reference numbers.

The following describes differences in structure between the integrated device 117 of the first embodiment and the integrated device 197 of the second embodiment.

According to the integrated device 117 of the first embodiment, the CPU-1 102 and the CPU-2 103 are connected with the access restriction circuit 106 via the internal bus 107. Compared with this, according to the integrated device 197 of the second embodiment, a CPU-1 182 and a CPU-2 183 are directly connected with an access restriction circuit 186 via signal lines 189 and 188, respectively.

The access restriction circuit 186 receives an access permission signal not from the switching mechanism 185 but from a CPU that has switched to the protection mode via the signal lines 188 or 189, and connects the internal memory 104 with the internal bus 107.

Similarly, when a CPU operating in the protection mode completes execution of the protection program 111, the CPU operating in the protection mode outputs an access prohibition signal to the access restriction circuit 186.

Also, the switching mechanism 185 has the same internal structure as the switching mechanism 105. However, according to the switching mechanism 185, a signal output unit and the access restriction circuit 186 are not directly connected with each other, and the signal output unit does not output an access permission signal and an access prohibition signal to the access restriction circuit 186.

2.2 Operations

The following describes the difference in operations between the first embodiment and the second embodiment.

In the first embodiment, access permission/prohibition to the internal memory 104 is realized by the access restriction circuit 106 under control of the switching mechanism 105.

Compared with this, in the second embodiment, access permission/prohibition to the internal memory 104 is realized by the access restriction circuit 186 under control of the CPU that has switched to the protection mode.

In a case where, for example, the CPU-1 182 switches from the normal mode to the protection mode, the CPU-1 182 outputs an access permission signal to the access restriction circuit 186. Upon receiving the access permission signal, the access restriction circuit 186 connects the internal memory 104 with the internal bus 107. In a case where the CPU-1 182 switches from the protection mode to the normal mode, the CPU-1 182 outputs an access prohibition signal to the access restriction circuit 186. Upon receiving the access prohibition signal, the access restriction circuit 186 disconnects between the internal memory 104 and the internal bus 107.

Also, in a case where the CPU-2 183 switches from the normal mode to the protection mode, the CPU-2 183 outputs an access permission signal to the access restriction circuit 186. Upon receiving the access permission signal, the access restriction circuit 186 connects the internal memory 104 with the internal bus 107. In a case where the CPU-2 183 switches from the protection mode to the normal mode, the CPU-2 183 outputs an access prohibition signal to the access restriction circuit 186. Upon receiving the access prohibition signal, the access restriction circuit 186 disconnects between the internal memory 104 and the internal bus 107.

The second embodiment is the same as the first embodiment excepting the above difference, and accordingly the description of the second embodiment is omitted here.

3. Third Embodiment

The following describes a third embodiment of the present invention with reference to the drawings. Note that the description of the structure of the third embodiment that is the same as that of the first or second embodiment is omitted here, and characteristics of the third embodiment are mainly described.

3.1 Outline

Figure 8:
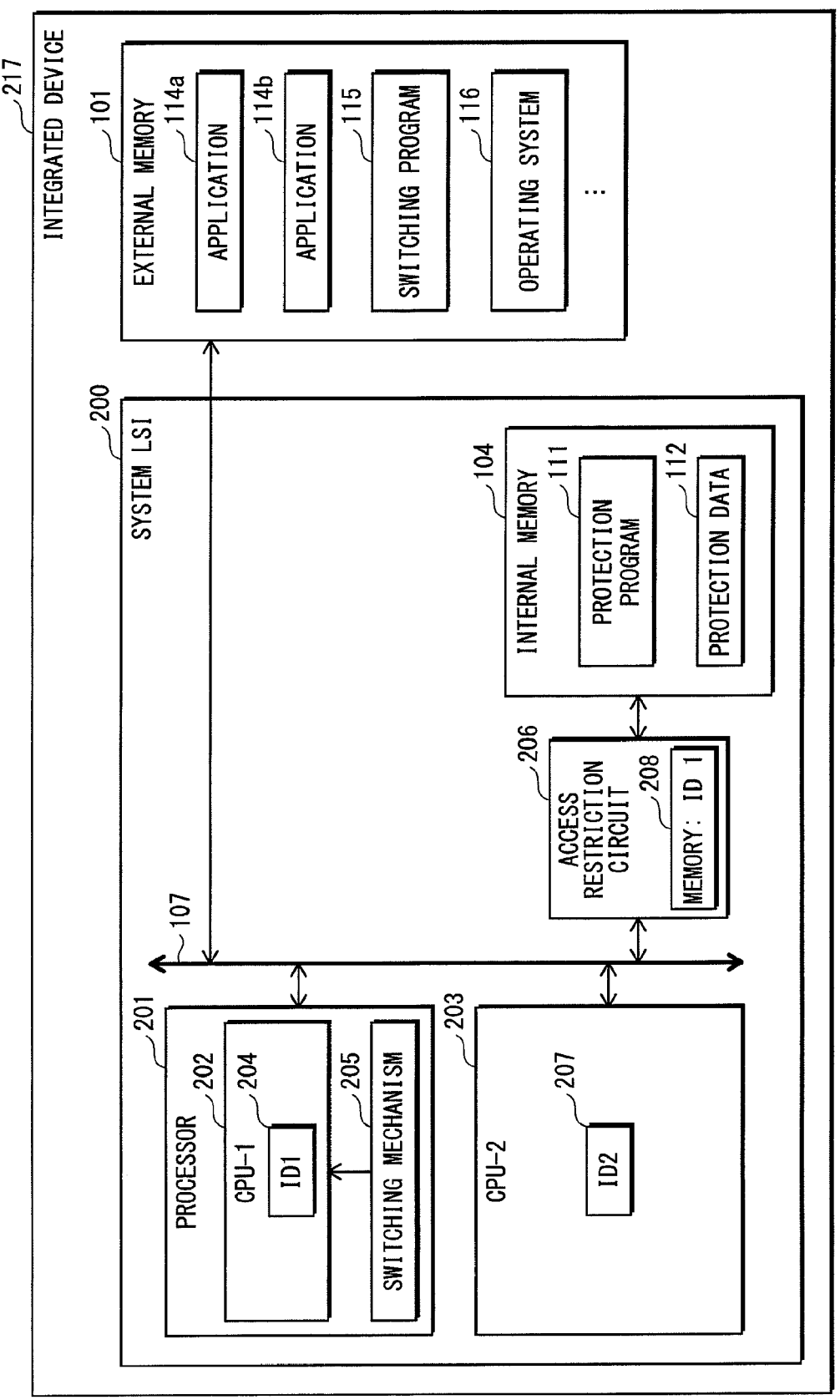
FIG. 8 is a block diagram showing the hardware structure of an integrated device 217 according to a third embodiment.

An integrated device 217 according to the third embodiment of the present invention includes, as shown in FIG. 8, a system LSI 200 and an external memory 101. The system LSI 200 includes a processor 201, a CPU-2 203, an access restriction circuit 206, and an internal memory 104. The processor 201 includes a CPU-1 202 and a switching mechanism 205.

Note that compositional elements of the integrated device 217 having the same structures as those of the first embodiment are denoted with the same reference numbers. Specifically, the processor 201, the CPU-2 203, the switching mechanism 205, and the access restriction circuit 206 are different from those of the first embodiment.

In the third embodiment, each of the CPUs stores therein an identifier (hereinafter "ID") for identifying the CPU.

The access restriction circuit 206 stores therein an ID of a CPU operating in the protection mode while the system LSI 200 operates in the protection mode. The access restriction circuit 206 judges, using the ID stored therein, whether a CPU that requests to access the internal memory 104 is a CPU operating in the protection mode. Only if judging affirmatively, the access restriction circuit 206 permits the CPU that request the access to access the internal memory 104.

For simplification of description, the following description is based on the assumption that only the CPU-1 202 can switch to the protection mode.

Also, in the first embodiment, the internal bus 107 and the internal memory 104 are connected with each other via the access restriction circuit 106 only while the CPU operates in the protection mode. Compared with this, in the second embodiment, the internal bus 107 and the internal memory 104 are always connected with each other via the access restriction circuit 206.

3.2 Structure

The following describes the CPU-1 202, the switching mechanism 205, the CPU-2 203, and the access restriction circuit 206 among the compositional elements of the integrated device 217.

(1) CPU-1 202

The CPU-1 202 stores therein an ID "ID1" 204 unique thereto, which is written at the time of manufacture of the integrated device 217, and is stored in a non-rewritable storage region within the CPU-1 202.

When attempting to access the internal memory 104, the CPU-1 202 reads the ID "ID1" 204 stored therein, and outputs the read ID "ID1" 204 together with an access request to the access restriction circuit 206.

(2) Switching Mechanism 205

The switching mechanism 205 switches the CPU-1 202 to the protection mode in response to a request by the switching program 115.

The switching mechanism 205 has substantially the same internal structure as the switching mechanism 105 described in the first embodiment. However, according to the switching mechanism 205, the signal output unit outputs an access permission signal and an access prohibition signal each including the ID "ID1" 204 indicating the CPU-1 202 to the access restriction circuit 206 via the internal bus 107.

Also, unlike the switching mechanism 105 of the first embodiment, according to the switching mechanism 205, the signal output unit does not output a reset signal to the CPU-2 203 when the CPU-1 202 switches from the normal mode to the protection mode and while the CPU-1 202 operates in the protection mode.

Also, the CPU register saving/restoration unit of the switching mechanism 205 performs saving/restoration of only a register content of the CPU-1 202, and does not perform saving/restoration of a register content of the CPU-2 203.

Also, the bank switching unit of the switching mechanism 205 manages which interrupt vector is to be used for each CPU.

Specifically, for the CPU-2 203, the bank switching unit determines that a normal mode interrupt vector is always to be used. Also, for the CPU-1 201, the bank switching unit determines that a protection mode interrupt vector is to be used when the CPU-1 201 switches to the protection mode, and determines that a normal mode interrupt vector is to be used when the CPU-1 201 switches to the normal mode.

(3) CPU-2 203

The CPU-2 203 stores therein an ID "ID2" 207 unique thereto, which is written at the time of manufacture of the integrated device 217, and is stored in a non-rewritable storage region within the CPU-2 203.

When transmitting an access request to the access restriction circuit 206 for requesting to access to the internal memory 104, the CPU-2 203 also transmits the ID "ID2" 207 identifying itself.

The CPU-2 203 always operates in the normal mode, and accordingly uses the normal mode interrupt vector, which is included in the two interrupt vectors stored in the switching mechanism 205.

Also, while the CPU-1 202 operates in the protection mode, no reset signal is output to the CPU-2 203. Accordingly, the CPU-2 203 can operate in the normal mode while the CPU-1 202 operates in the protection mode.

(4) Access Restriction Circuit 206

The access restriction circuit 206 includes therein a memory 208.

The access restriction circuit 206 receives an access permission signal and an access prohibition each including an ID from the signal switching mechanism 205.

When receiving an access permission signal, the access restriction circuit 206 stores, in the memory 208, an ID included in the access permission signal. Note that, in the third embodiment, the access restriction circuit 206 stores the "ID1" identifying the CPU-1 202 in the memory 208.

When receiving an access prohibition signal, the access restriction circuit 206 deletes, from the memory 208, an ID included in the access prohibition signal.

Also, the access restriction circuit 206 receives an access request together with the ID from the CPU-1 202 or the CPU-2 203.

Then, the access restriction circuit 206 checks whether the ID received together with the access request matches the ID stored in the memory 208.

As a result of the check, if the received ID matches the ID stored in the memory 208, the access restriction circuit 206 judges that the received access request is an access request output by a CPU that operates in the protection mode, and permits the CPU that request the access to access to the internal memory 104.

If the received ID does not match the ID stored in the memory 208, or if no ID is stored in the memory 208, the access restriction circuit 206 judges that the received access request is an access request by a CPU that is not operating in the protection mode, and rejects the access request.

3.3 Operations

The following describes the operations of the integrated device 217, compared with those in the first embodiment.

Upon receiving a call from the application 114, the switching program instructs the switching mechanism 205 to save a register content.

Upon receiving this instruction, the switching mechanism 205 saves only a register content of the CPU-1 202.

In the first embodiment, permission or prohibition of access to the internal memory 104 is realized by the access restriction circuit 106 connecting or disconnecting between the internal bus 107 and the internal memory 104 under control of the switching mechanism 105.

Compared with this, in the third embodiment, in order to switch the CPU-1 202 to the protection mode, the switching mechanism 205 reads the ID "ID1" 202 identifying the CPU-1 202, and outputs an access permission signal including the read ID "ID1" 202 to the access restriction circuit 206.

Upon receiving the access permission signal from the switching mechanism 205, the access restriction circuit 206 stores, in the memory 208, the ID "ID1" 202 included in the received access permission signal.

Then, the switching mechanism 205 outputs a reset signal to only the CPU-1 202 for a predetermined period, and does not output a reset signal to the CPU-2 203, unlike that in the first embodiment.

The switching mechanism 205 sets a reset vector for the CPU-1 202 to a protection mode reset vector. This completes the operation mode switching of the CPU-1 202 to the protection mode.

When attempting to access to the internal memory 104 while operating, each of the CPUs reads an ID stored therein, and notifies the access restriction circuit 206 of the read ID and an access request via the internal bus 107.

The access restriction circuit 206 compares the ID received together with the access request with the ID "ID1" stored in the memory 208.

If the received ID matches the stored ID "ID1", the access restriction circuit 206 permits the CPU that request the access to access the internal memory 104. If the received ID does not match the stored ID "ID1", the access restriction circuit 206 prohibits the CPU that request the access from accessing the internal memory 104.

More specifically, when the CPU-1 202 operating in the protection mode tries to access the internal memory 104, the CPU-1 202 notifies the access restriction circuit 206 of an access request and the ID "ID1" 204 identifying the CPU-1 202 via the internal bus 107. The access restriction circuit 206 compares the ID "ID1" stored in the memory 208 with the ID "ID1" 204 received together with the access request, and confirms that these two IDs match each other. Accordingly, the access restriction circuit 206 permits the CPU-1 202 to access the internal memory 104, and the CPU-1 202 accesses the internal memory 104.

On the other hand, when the CPU-2 203 tries to access the internal memory 104, the CPU-2 203 notifies the access restriction circuit 206 of an access request and the ID "ID2" 207 identifying the CPU-2 203 via the internal bus 107. The access restriction circuit 206 compares the ID "ID1" stored in the memory 208 with the ID "ID2" received together with the access request, and confirms that these two IDs do not match each other. Accordingly, the access restriction circuit 206 rejects the access request from the CPU-2 203.

The CPU-1 202 executes the protection program 111 to perform protection processing. When the protection processing completes, the protection program 111 writes a value "0" into the switching register included in the switching mechanism. In accordance with this timing, the CPU-1 202 switches from the protection mode to the normal mode.

While processing of switching the CPU-1 202 to the normal mode is being performed, the switching mechanism 205 outputs an access prohibition signal including the ID "ID1" 204 indicating the CPU-1 202 to the access restriction circuit 206.

The access restriction circuit 206 receives the access prohibition signal, and deletes, from the memory 208, the ID "ID1" 204 included in the received access prohibition signal.

Subsequently, the memory of the access restriction circuit 206 stores no ID, and accordingly the access restriction circuit 206 rejects access requests of all of the CPUs.

3.4 Conclusion

In the third embodiment, like the first and second embodiments, it is possible to restrict a CPU that has not been switched (or cannot switch) to the protection mode to access the internal memory 104. This can reduce the risk of unauthorized access to the protection program 111 and the protection data 112.

Furthermore, in the third embodiment, even while the CPU-1 202 operates in the protection mode, the CPU-2 203 does not stop. Accordingly, even while the CPU-1 202 process a protection program or protection data, the CPU-2 203 can operate as a CPU for processing programs and data (programs and data that does not need to be protected) that can be processed in the normal mode. This can speed up processing in whole the system.

The third embodiment is the same as the first embodiment excepting the above difference, and accordingly the description of the third embodiment is omitted here.

Note that, in the above third embodiment, the switching mechanism 205 outputs an access permission signal and an access prohibition signal each including an ID to the access restriction circuit 206 via the internal bus 107. Alternatively, the switching mechanism 205 may output an access permission signal and an access prohibition signal each including an ID to the access restriction circuit 206 via a signal line.

Also, in the third embodiment, the internal bus 107 and the internal memory 104 are always connected with each other via the access restriction circuit 227. Alternatively, like the first embodiment, the access restriction circuit 227 may connect/disconnect between the internal bus 107 and the internal memory 104 based on an access permission/prohibition signal received from the switching mechanism 205.

Also, if the number of CPUs that can operate in the protection mode is only one, an ID identifying the one CPU maybe stored in advance in the switching mechanism 205.

In this case, the following may be employed. That is, an ID is not stored or deleted each time an access permission signal or an access prohibition signal is received. Instead, until an access prohibition signal is received after an access permission signal has been received, a CPU corresponding to the ID is permitted to access to the internal memory 104.

4. Fourth Embodiment

The following describes a fourth embodiment of the present invention with reference to the drawings. Note that descriptions of the fourth embodiment having the same structures as the first to third embodiments are omitted here, and characteristics of the fourth embodiment are mainly described.

4.1 Outline

Figure 9:
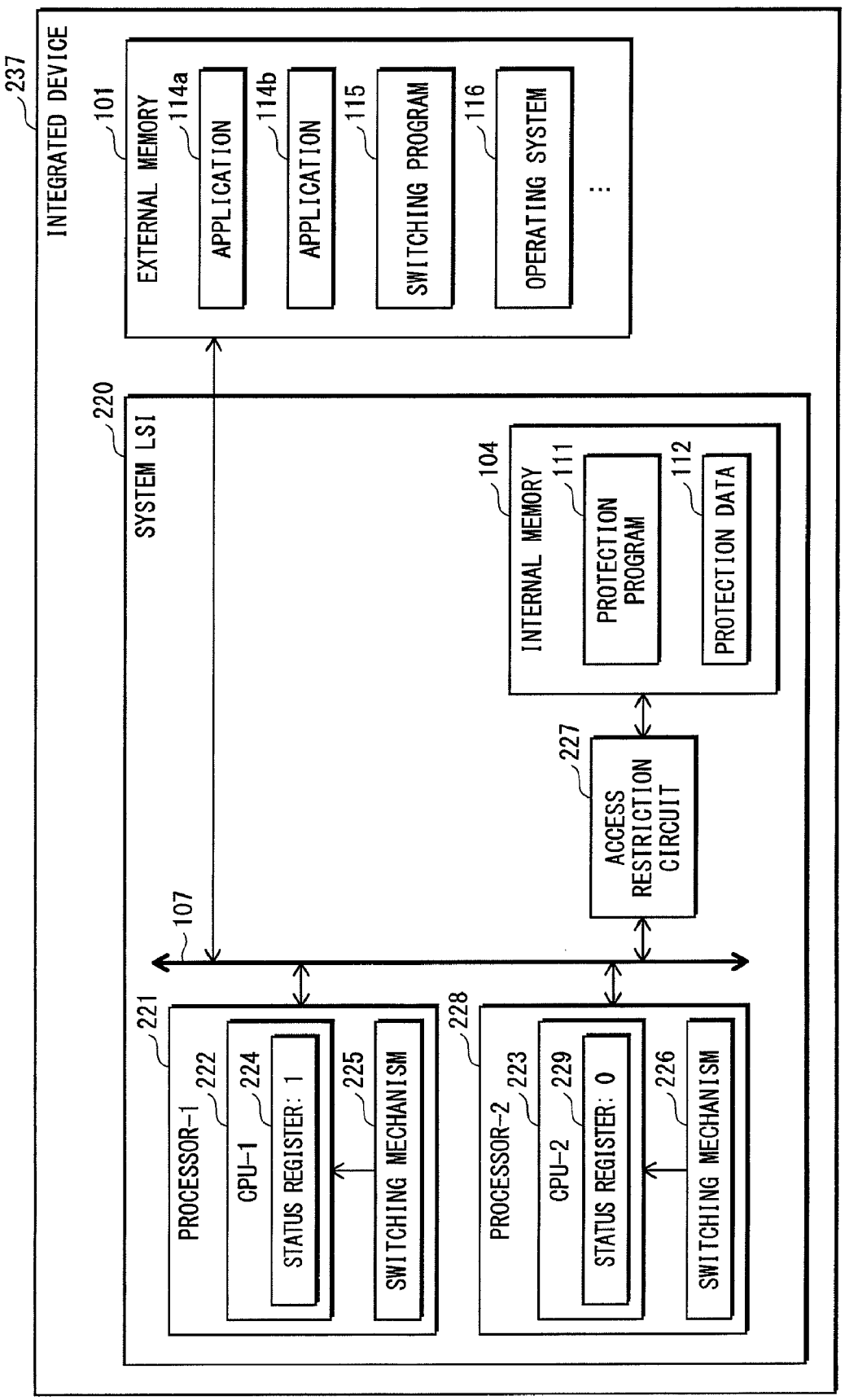
FIG. 9 is a block diagram showing the hardware structure of an integrated device 237 according to a fourth embodiment.

An integrated device 237 according to the fourth embodiment of the present invention includes, as shown in FIG. 9, a system LSI 220 and an external memory 101. The system LSI 220 includes a processor-1 221, a processor-2 228, an access restriction circuit 227, and an internal memory 104.

Note that compositional elements of the integrated device 237 having the same structures as those of the third embodiment are denoted with the same reference numbers. Specifically, the processor-1 221, the processor-2 228, and the access restriction circuit 227 are different from those of the third embodiment.

The processors each store therein mode information indicating an operation mode thereof. When making an access request to the internal memory 104, the processors each output the mode information stored therein together with the access request to the access restriction circuit 227.

The access restriction circuit 227 determines whether to permit access by the processor based on the mode information received together with the access request.

Note that, in the fourth embodiment, like the third embodiment, the internal bus 107 and the internal memory 104 are always connected with each other via the access restriction circuit 227.

4.2 Structure

The following describes the processor-1 221, the processor-2 228, and the access restriction circuit 227 among the compositional elements of the integrated device 237.

(1) Processor-1 221 and Processor-2 228

The processor-1 221 and the processor-2 228 have the same structure, and accordingly only the processor-1 221 is described here.

As shown in FIG. 9, the processor-1 221 includes a CPU-1 222 and a switching mechanism 225.

(1-1) CPU-1 222

The CPU-1 222 includes a status register 224. The status register 224 stores therein mode information showing a current operation mode of the CPU-1 222. Specifically, mode information "1" shows a protection mode, and mode information "0" shows a normal mode.

When attempting to the internal memory 104, the CPU-1 222 reads mode information stored in the status register 224, and outputs the read mode information together with an access request to the access restriction circuit 227 via the internal bus 107.

The CPU-1 222 stores the mode information in the status register 224. Alternatively, each time the CPU-1 222 tries to access the internal memory 104, the CPU-1 222 may generate mode information with reference to the switching register included in the switching mechanism 225, and output the generated mode information together with the access request.

(1-2) Switching Mechanism 225

The switching mechanism 225 switches only the CPU-1 222 between the operation modes. The detailed internal structure of the switching mechanism 225 is the same as that of the switching mechanism 105 described in the first embodiment. However, a signal output unit of the switching mechanism 225 outputs a reset signal to only the CPU-1 222.

Also, the signal output unit of the switching mechanism 225 does not output an access prohibition signal and an access permission signal to the access restriction circuit 227.

Also, a bank switching unit of the switching mechanism 225 manages only an interrupt vector to which the CPU-1 222 refers. Only the CPU-1 222 refers to one available of two interrupt vectors.

Also, if the CPU-1 222 switches to the protection mode, the signal output unit of the switching mechanism 225 writes mode information "1" into the status register 224 of the CPU-1 222.

Conversely, if the CPU-1 222 switches from the protection mode to the normal mode, the signal output unit of the switching mechanism 225 writes mode information "0" into the status register 224 of the CPU-1 222.

(2) Access Restriction Circuit 227

The access restriction circuit 227 receives an access request and mode information from the CPU-1 222 or the CPU-2 223.

Upon receiving the access request and the mode information, the access restriction circuit 227 checks which of the protection mode and the normal mode is indicated by the received mode information.

If the received mode information "1" indicating the protection mode, the access restriction circuit 227 permits the CPU that request the access to access the internal memory 104. Controversy, if the received mode information "0" indicating the normal mode, the access restriction circuit 227 rejects the access request from the CPU that request the access.

4.3 Operations

Next, the following describes the operations of the integrated device 237 of the fourth embodiment, compared with that of the third embodiment.

In the third embodiment, the switching mechanism outputs in advance, to the access restriction circuit, an access permission signal or an access prohibition signal each including an ID identifying a CPU that has switched to the protection mode. The access restriction circuit stores therein an ID operating in the protection mode based on the ID included in the access permission signal or the access prohibition signal received from the switching mechanism.

Also, in the third embodiment, the access restriction circuit permits or prohibits access by a CPU to the internal memory based on the ID stored in the access restriction circuit.

Compared with this, in the fourth embodiment, although the switching mechanism 225 of the processor 1 switches the CPU-1 222 to the operation mode, the switching mechanism 225 does not output signals to other compositional units in accordance with the switching. Instead, the switching mechanism 225 writes the mode information into the status register 224 of the CPU-222.

When attempting to access the internal memory 104, the CPU-1 222 of the processor 1 reads mode information from the status register 224, and outputs the read mode information and an access request to the access restriction circuit 227.

The access restriction circuit 227 receives the mode information and the access request from the CPU-1 222. If the received mode information is a value "1", the access restriction circuit 227 permits the CPU-1 222 to access the internal memory 104. If the received mode information is a value "0", the access restriction circuit 227 prohibits the CPU-1 222 from accessing the internal memory 104.

The operations of the processor 2 are the same as those of the processor 1, and accordingly the description thereof is omitted here.

4.4 Conclusion

In the fourth embodiment, like the first to third embodiments, it is possible to restrict a CPU that has not been switched (or cannot switch) to the protection mode to access the internal memory 104. This can reduce the risk of unauthorized access to the protection program 111 and the protection data 112.

Furthermore, the CPU-2 223 can switch to the protection mode independently from the CPU-1 222. Accordingly, in the fourth embodiment, the CPU-1 222 and the CPU-2 223 each operating in the protection mode perform processing simultaneously. This makes it possible to realize a multi CPU system for performing protection processing. That is, it is possible to speed up processing in the protection mode.

The fourth embodiment is the same as the third embodiment excepting the above difference, and accordingly the description of the fourth embodiment is omitted here.

Note that, in the above fourth embodiment, the internal bus 107 and the internal memory 104 are always connected with each other via the access restriction circuit 227. Alternatively, like the first embodiment, the switching mechanism that has switched a CPU from the normal mode to the protection mode may output an access permission/prohibition signal to the access restriction circuit 227, and the access restriction circuit 227 may connect/disconnect between the internal bus 107 and the internal memory 104 based on the access permission/prohibition signal received from the switching mechanism.

5. Modification Examples

While the present invention has been described based on the above first to fourth embodiments, the present invention is of course not limited to these embodiments. The present invention includes the following modifications examples.

(1) In the above embodiments, the switching program always performs operations of switching each CPU to the protection mode. Alternatively, it may be possible, for example, to control the CPU not to switch to the protection mode in accordance with the priority level of an application.

As a more specific example, there is a case where the switching program does not start switching the CPU to the protection mode while data is input/output by a user's operation.

Alternatively, it may be possible to compare which of a program being executed by the CPU-1 and a program being executed by the CPU-2 has a higher priority level, and control whether or not to switch each of the CPUs to the protection mode in accordance with a result of the comparison. For example, if the switching program switches the CPU-1 to the protection mode while the CPU-1 executes a program that is for the normal mode (a program that does not need to be protected) but is an important program, the CPU-1 will be occupied with performing processing for the protection mode, and processing of the important program for the normal mode being executed by the CPU-1 will be suspended.

Here, by applying the above modification example to this case, if the program being executed by CPU-1 has a lower priority level than that of the processing for the protection mode, the switching program starts controlling the CPU-1 to switch to the protection mode, like the above embodiments.

If the program being executed in the CPU-1 has a higher priority than that of the processing for the protection mode, the switching program executes the important program that has the higher priority in preference to the processing for the protection mode. After execution of this important program completes, the switching program starts controlling the CPU-1 to switch to the protection mode.

(2) The above embodiments did not provide explanations about how to perform operations of saving the status of the CPU-1 if an interruption occurs while the CPU-1 executes a protection program in the protection mode and how to operations of restoring the saved status from the internal memory to the CPU-1. For example, it may be possible to realize these operations by using a protection program.

Alternatively, it may be possible to realize the operations using a handler that is stored in a region indicated by an address included in the protection mode interrupt vector (for example, an interruption program stored in the internal memory) in accordance with a type of an interruption.

(3) In the above first and second embodiments, before stopping the CPU-2 using a reset signal, the switching program may change a notification destination of an interruption by a peripheral circuit (not shown) to the CPU-2, from the CPU-2 to the CPU-1. Also, before canceling the reset signal over the CPU-2, the switching program may change again the notification destination from the CPU-1 to the CPU-2. According to this structure, if an interruption to the CPU-2 occurs while the CPU-2 stops, the CPU-1 can perform processing relating to this interruption, instead of the CPU-2. Note that the operation for changing the notification destination may be performed by the switching program, or a program other than the switching program such as a protection program.

(4) In the above second embodiment, each time an instruction is made, it may be possible to output signals respectively indicating that the CPU-1 182 and the CPU-2 183 are permitted to access the internal memory. Alternatively, immediately after each of the CPUs has switched to the protection mode, it may be possible to output a signal indicating that "access is always permitted". Also, when the CPU switches from the protection mode to the normal mode, it may be possible to output a signal indicating that "from now on, access is always prohibited".

Further alternatively, it may be possible to output a signal indicating access permission/prohibition for each program. That is, a signal indicating access permission/prohibition may be output in accordance with a timing that is different from a timing for switching the operation mode of the CPU.

(5) In the above embodiments, the CPU-1 and the CPU-2 may be CPUs each capable of executing a different instruction code. In this case, one of the CPUs that is capable of executing the protection program is selected as a CPU for operating in the protection mode.

(6) In the above embodiments, the switching program is operated by the CPU-1. Alternatively, the switching program may be operated by the CPU-2. Furthermore, in the above embodiments, the switching program and the protection program are operated by the same CPU. Alternatively, the switching program and the protection program each may be operated by a different CPU.

(7) In the above embodiments, the protection program is activated immediately after the integrated device 117 has been activated. Alternatively, the protection program may be activated immediately before the protection program is executed, for example.

(8) In the above first embodiment, the restoration address of the switching program 115 is written into the program counter of the CPU-1 in Step S132. Alternatively, the following structure may be possible. For example, the switching mechanism includes a register for storing a restoration address, and the switching program writes its own restoration address into the register before the switching mechanism outputs a reset signal.

(9) In the above embodiments, the descriptions have been provided with use of the system LSI including two CPUs. Alternatively, it may be possible to use a system LSI including no less than three CPUs. In such a case, the system LSI may include a plurality of CPUs that can switch to the protection mode.

If the number of CPUs that can switch to the protection mode is plural, it may be possible to use a structure in which a plurality of CPUs simultaneously operate in the protection mode, or a structure in which while one CPU operates in the protection mode, the others of the CPUs cannot switch to the protection mode.

For example, in a case where the size of the protection program is small and one CPU can sufficiently operate this protection program, it is only necessary that one CPU operates in the protection mode. In this case, it is possible to save a consumption power by stopping the other CPU, like the first or second embodiment. The other CPU that is stopped here may be a CPU that can switch to the protection mode. Furthermore, if the number of CPUs that operate in the protection mode is one, it is possible to use program resources developed for conventional single CPU without modification.

Conversely, in a case where the size of the protection program is large and high-load processing needs to be performed, it is possible to speed up processing performed by the protection program because a plurality of CPUs can simultaneously operate in the protection mode.

Furthermore, like the third or fourth embodiment, in a case where a CPU other than a CPU that is executing the protection program can perform processing for the normal mode, it is possible to improve the processing capability of the whole system by controlling more CPUs to perform processing for the normal mode.

On the other hand, in a case where the number of CPUs that can operate in the protection mode is only one, it is possible to use program resources developed for conventional single CPU without modification.

(10) In the above first and second embodiments, the signal output unit stops the CPU-2 by continuing outputting a reset signal to the CPU-2. Alternatively, it may be of course possible to realize the present invention by using a special CPU, which stops during operations of other CPU in the protection mode. For example, in a case where such a special CPU is used as the CPU-2, the switching mechanism notifies the CPU-2 of whether the CPU-1 is currently operating in the normal mode or the protection mode. In accordance with this notification, the CPU-2 stops or restarts operations.

Also, the method of stopping the CPU is not limited to a method of continuing outputting a reset signal to the CPU. For example, it may be possible to use a method of stopping clock signals of the CPU, a method of suspending supply of an electric power to the CPU, or the like. These methods can achieve the same effects as that of the method of continuing outputting a reset signal. Furthermore, in a case where an interrupt vector can be set for each CPU, it is possible to stop the CPU-2 by rewriting a reset interruption included in an interrupt vector of the CPU-2, at the time when the CPU-1 switches to the protection mode, so as to be an address in which an instruction to perform no processing is written, for example.

(11) In the above fourth embodiment, each of all the CPUs notifies the access restriction circuit 227 of the operation mode of the CPU. Alternatively, a certain CPU among the CPUs may not need to notify of the operation mode thereof. In this case, upon receiving mode information indicating the operation mode from a CPU together with an access request, the access restriction circuit 227 judges whether to permit the CPU to access the internal memory based on the received mode information. Here, if the access restriction circuit 227 receives only an access request without mode information from a CPU, the access restriction circuit 227 rejects the access request from the CPU.

According to this structure, it is possible to realize a system including both a CPU that has a function of holding therein mode information and notifying the access restriction circuit 227 of the mode information and a normal CPU that does not have such a function. Accordingly, it is possible to implement the present invention with lower costs compared with a case where all the CPUs included in the system each have a function of notifying the access restriction circuit 227 of the mode information thereof.

Also, each CPU may notify the access restriction circuit 227 of the mode information thereof only if the CPU operates in the protection mode. In this case, the access restriction circuit 227 receives only an access request that is transmitted together with mode information.

(12) In the above embodiments, programs and data operating in the normal mode are stored in the external memory 101. Alternatively, as long as processing is performed such that a CPU operating in the normal mode cannot access protection programs and data using encryption technology or the like, the CPU operating in the normal mode may perform processing on the programs and data operating in the normal mode using the internal memory.

(13) In the above third embodiment, the system LSI 200 includes the switching mechanism 205 corresponding to the CPU-1 202. In addition to the switching mechanism 205, the system LSI 200 may include a switching mechanism corresponding to the CPU-2 203. In this case, if either of the CPU-1 202 and the CPU-2 203 switches to the protection mode, a switching mechanism corresponding to the CPU that has switched to the protection mode outputs, to the access restriction circuit 206, an access permission notification including an ID identifying the CPU that has switched to the protection mode. If both the CPU-1 202 and the CPU-2 203 switch to the protection mode, the access restriction circuit 206 stores, in the memory 208 included therein, both IDs respectively identifying the CPU-1 202 and the CPU-2 203. Then, if an ID received together with an access request matches either one of the stored IDs, the access restriction circuit 206 permits the CPU corresponding to the matched ID to access the internal memory 104. By applying this structure to the third embodiment, it is possible to realize a multi CPU system for performing processing for the protection mode in the third embodiment. This can speed up processing in whole the system.

Furthermore, in this case, each of the switching mechanisms only has to manage an interrupt vector of a CPU corresponding thereto.

(14) In the above third and fourth embodiments, the switching mechanism is included in a processor including a CPU whose operation mode is to be switched. Alternatively, the switching mechanism may be, for example, connected with each CPU via a dedicated line.

(15) In the above first to fourth embodiments and the modification examples, the descriptions are based on the assumption that the integrated device is a portable consumer appliance capable of playing back music data and the like.

Alternatively, the integrated device may be a video playback device such as a DVD player having the same method of executing a protection program as that in the above embodiments. Further alternatively, the integrated device may be any of a various types of appliances such as a personal computer, a mobile phone, a digital camera, and a game device. In other words, the integrated device of the present invention may be any processing device that handles programs and data that need to be protected.

(16) In the above embodiments, the reset interruption included in the protection mode interrupt vector indicates an address of the protection program stored in the internal memory. Alternatively, assume, for example, that the integrated device is a system in which protection programs and data are deleted from the internal memory each time a CPU switches between operation modes, and the protection programs and data are securely stored in a ROM or the like (not shown).

In this case, the reset interruption included in the protection mode interrupt vector indicates an address of a program for reading the protection program and data from the ROM into the internal memory.

Also, in the above embodiments, by using the reset interruption included in the protection mode interrupt vector stored in the bank switching unit, control is performed such that when a CPU switches to the protection mode, the protection program is executed. Alternatively, instead of the above control, it may be possible to provide a mechanism for example in which while any of CPUs operates in the protection mode, an access request to an external memory by the CPU operating in the protection mode is rejected. This mechanism can be realized for example by providing a switching mechanism for connecting and disconnecting between the external memory and the internal bus. In this case, when a value "1" is written into a switching register, a signal output unit of the switching mechanism outputs a disconnection signal indicating disconnection between the external memory and the internal bus to the switching mechanism. Upon receiving the disconnection signal, the switching mechanism disconnects between the external memory and the internal bus. Also, when a value "0" is written into the switching register, the signal output unit outputs a connection signal indicating connection between the external memory and the internal bus to the switching mechanism. Upon receiving the connection signal, the switching mechanism connects between the external memory and the internal bus.

In this case, an access range of the CPU can access is certainly limited to a recording region within the system LSI. Accordingly, even if an unauthorized program is stored in the external memory, the unauthorized program cannot be executed by the CPU operating in the protection mode. Therefore, this can more efficiently reduce the risk of steal and tampering of the protection program and data.

Further alternatively, it may be possible to realize the protection mode of the CPU by structuring the CPU in the following way. The CPU is structured so as to receive a switching signal for instructing to switch the CPU to the protection mode from the switching mechanism via the signal line. Upon receiving this switching signal, the CPU activates or executes a program stored within the system LSI (that is, stored in the internal memory). For example, the switching mechanism outputs the switching signal only to a CPU that is a target of switching of the operation mode, and controls other CPU to stop (while the CPU that is the target operates in the protection mode, the switching mechanism continues outputting a reset signal to the other CPU).

That is, it may be possible to realize the protection mode of the CPU by using any method, as long as only a CPU that has switched to the protection mode access protection programs and data, and as a result the protection programs and data are protected against tampering and tapping, and processing that needs to be confidential is performed in such an environment.

(17) It may be possible to include software in the integrated device as part or all of the compositional elements described in the embodiments, as far as possible. In this case, it is possible to reduce an amount of hardware that needs to be included in the integrated circuit, and accordingly improve the integration degree more.

(18) It may be possible to include hardware in the integrated device as part or all of the compositional elements described in the embodiments, as far as possible. In this case, it is possible to speed up processing compared with the above case where software is included as the compositional elements. Such inclusion is especially useful for performing processing that needs speed-up for convenience of users, such as saving processing and restoration processing.

(19) Here, the system LSI may be called an IC, an LSI, a super LSI, and an ultra LSI, depending on the integration degree. The present invention of course includes all of the above IC, an LSI, a super LSI, and an ultra LSI, as the system LSI according to the above embodiments.

Furthermore, it may be possible to use an FPGA (Field Programmable Gate Array) programmable after manufacturing LSIs, and a reconfigurable processor in which connection and setting of the circuit cell inside an LSI can be reconfigured.

Furthermore, when a new technology for forming integrated circuits that replaces LSIs becomes available as a result of progress in semiconductor technology or semiconductor-derived technologies, compositional elements may be integrated using such technology. One possibility lies in adaptation of biotechnology.

(20) Furthermore, the present invention may be a computer-readable storage medium such as a flexible disk, a hard disk, a CD-ROM, an MO, a DVD, a DVD-ROM, a DVD-RAM, a BD, and a semiconductor memory, which stores a computer program or a digital signal. Furthermore, the present invention may be the computer program or the digital signal stored in the storage medium.

(21) Furthermore, the present invention is also an integrated circuit including a normal mode for performing processing using a program that does not need to be protected; and a protection mode for performing processing using a program protected against tampering, the integrated circuit comprising an internal memory for use in execution of the protected program; a plurality of execution units each operable to perform processing using a program; and a memory access control unit operable to, when an operation mode of the integrated circuit switches from the normal mode to the protection mode, control at least one of the plurality of execution units to execute the protected program, and permit only the at least one execution unit that is executing the protected program to access the internal memory.

With this structure, the integrated circuit according to the present invention can perform multi-processor processing by using the plurality of execution units. Furthermore, only at least one of the plurality of execution units, which is executing the protected program while the integrated circuit operates in the protection mode, is permitted to access the internal memory in which the protected program or the like is stored. Accordingly, it is possible to prevent the others of the plurality of execution units that are not executing the protected program from performing unauthorized access to data or the like stored in the internal memory.

(22) According to the integrated circuit of the above modification example (21), the memory access control unit may include: a switch subunit operable to, when the operation mode of the integrated circuit is switched from the normal mode to the protection mode, control the at least one execution unit to execute the protected program, and control the others of the plurality of execution units to stop; and an access control subunit operable to, when the operation mode is switched to the protection mode, permit the at least one execution unit to access the internal memory.

With this structure, the integrated circuit according to the present invention stops an execution unit that is not executing the protected program. Accordingly, it is possible to prevent an execution unit that is not executing the protected program from performing unauthorized access to data or the like stored in the internal memory.

(23) According to the integrated circuit of the above modification example (22), the switch subunit may stop the others of the execution units by outputting reset signals to the others of the execution units, the reset signals being for causing the others of the execution units to be reset.

(24) Also, according to the integrated circuit of the above modification example (23), the switch subunit may stop the others of the execution units by continuing outputting reset signals to the others of the execution units.

With the above structure, the integrated circuit according to the present invention can stop an execution unit that is not executing the protected program, by using only the reset signal. Accordingly, it is possible to realize the integrated circuit by using a general-purpose execution unit having no special structure.

(25) According to the integrated circuit of the above modification example (24), the switch subunit may be controlled by a switching program that is stored in an external memory outside of the integrated circuit.

(26) According to the integrated circuit of the above modification example (25), in a case where the protected program has a lower priority level than that of the program that does not need to be protected, the switch subunit may be controlled by the switching program.

With this structure, in a case where an execution unit, which is not executing the protected program, performs processing that does not need to be protected but has a higher priority level than that of the protected program, it is possible to cause the execution unit to delay switching to execution of the protected program. And as result, it is possible to suppress decrease in capability of the program that does not need to be protected.

(27) According to the integrated circuit of the above modification example (26), the switching mechanism may be controlled by the switching program. Specifically, when the operation mode of the integrated circuit is switched from the normal mode to the protection mode, the switching program saves the statuses of the plurality of execution units. Also, when the operation mode is switched from the protection mode to the normal mode, the switching program restores the saved statuses of the plurality of execution units.

With this structure, the integrated circuit according to the present invention can continue performing processing even before and after the operation mode is switched from the normal mode to the protection mode.

(28) According to the integrated circuit of the above modification example (27), the access restriction subunit may be controlled by the notification from the switch subunit. In the protection mode, the switch subunit may output a notification indicating that the at least one execution unit is permitted to access the internal memory. Also, in the normal mode, the switch subunit may output a notification indicating that the at least one execution unit is prohibited from accessing the internal memory.

(29) According to the integrated circuit of the above modification example (27), the access restriction subunit may be controlled by the notification from the at least one execution unit. If the at least one execution unit executes the protected program, the at lest one execution unit may output a notification indicating that the at least one execution unit is permitted to access the internal memory. Also, if the at lest one execution unit stops executing the protected program, the at lest one execution unit may output a notification indicating that the at least one execution unit is prohibited from accessing the internal memory.

(30) According to the integrated circuit of the above modification examples (28) and (29), in the normal mode, the access restriction subunit may prohibit the at least one execution unit from accessing the internal memory. Also, the internal memory may store therein a status of the protected program that is being executed by any of the plurality of execution units.

(31) According to the integrated circuit of the above modification example (30), when the operation mode of the integrated circuit is switched from the protection mode to the normal mode, the status of the protected program that is being executed may be acquired from the execution unit that has executed the protected program. Also, when the operation mode is switched from the normal mode to the protection mode, the status of the protected program may be restored to the execution unit that has executed the protected program.

With this structure, a status of a program that needs to be protected that is being suspended is stored in the internal memory, to which access in the normal mode is impossible. Accordingly, it is possible to securely suspend operations for the protection mode, and securely restart the suspended operations.

(32) According to the integrated circuit of the above modification example (21), upon receiving a notification that indicates the operation mode of the integrated circuit is switched to the protection mode from the memory access control unit, the at least one execution unit may execute the protected program. Also, upon receiving a notification that indicates the operation mode is switched to the protection mode from the memory access control unit, the others of the plurality of the execution units that are other than the at least one execution unit may stop operations thereof. Furthermore, the memory access control unit may include: a switch subunit operable to, when the operation mode is switched to the protection mode, output, to the plurality of execution units, a notification that indicates the operation mode is switched to the protection mode; and an access control subunit operable to, when the operation mode is switched to the protection mode, permit the at least one execution unit to access the internal memory.

With this structure, when the operation mode is switched to the protection mode, the integrated circuit according to the present invention stops an execution unit that is not executing the protected program. Accordingly, it is possible to prevent unauthorized access by an execution unit that is not executing the protected program to data or the like stored in the internal memory.

(33) According to the integrated circuit of the above modification example (21), each of the plurality of execution units may notify the memory access control unit of identification information for identifying the execution unit together with an access request that requests to the internal memory. The memory access control unit may include a switch subunit operable to, when the operation mode is switched to the protection mode, notify of identification information of an execution unit that has executed the protected program: an access control subunit operable to receive, from the switch subunit, the identification information of the execution unit that is executing the protected program, and permit the execution unit to access the internal memory if the identification information received together with the access request matches the identification information received from the switch subunit.

With this structure, without stopping an execution unit that is not executing the protected program, the integrated circuit according to the present invention prohibits the execution unit from accessing the internal memory. Therefore, the execution unit that is not executing the protected program can continue performing processing relating to a program and data that do not need to be protected. As a result, it is possible to speed up processing in whole the system.

(34) According to the integrated circuit of the above modification example (21), each of the plurality of execution units may notify of the memory access control unit whether the execution unit has executed the protected program, together with an access request for accessing to the internal memory. The memory access control unit may include: a switch subunit operable to, when the operation mode is switched from the normal mode to the protection mode, control the at least one execution unit to execute the protected program; and an access control subunit operable to, upon receiving a notification indicating that the at least one execution unit has executed the protected program together with an access request, permit the at least one execution unit to access the internal memory.

With this structure, without stopping an execution unit that is not executing the protected program, the integrated circuit according to the present invention prohibits the execution from accessing the internal memory. Therefore, the execution unit that is not executing the protected program can continue performing processing relating to a program and data that do not need to be protected. As a result, it is possible to speed up processing in whole the system.

(35) Also, the present invention may be an information processing device comprising: an external memory; and an integrated circuit having a normal mode for performing processing a program that does not need to be protected and a protection mode for performing processing a program and data that are protected, wherein the external memory stores therein the program that does not need to be protected, and the integrated circuit includes: an internal memory for use in execution of the protected program and data; a plurality of execution units each operable to perform processing using a program; a memory access control unit operable to, when an operation mode of the integrated circuit is switched from the normal mode to the protection mode, control at least one of the plurality of execution units to execute the protected program, and permit only the at least one execution unit that has executed the protected program to access the internal memory.

(36) Also, the present invention may be a method for use in an integrated circuit having a normal mode for performing processing a program that does not need to be protected and a protection mode for performing processing a program and data that are protected, wherein the integrated circuit includes: an internal memory for use in execution of the protected program and data; and a plurality of execution units each operable to perform processing using a program, and the method comprises a memory access control step for, when an operation mode of the integrated circuit is switched from the normal mode to the protection mode, controlling at least one of the plurality of execution units to execute the protected program, and permit only the at least one execution unit that has executed the protected program to access the internal memory.

(37) Also, the present invention may be a program for use in an integrated circuit having a normal mode for performing processing a program that does not need to be protected and a protection mode for performing processing a program and data that are protected, wherein the integrated circuit includes: an internal memory for use in execution of the protected program and data; and a plurality of execution units each operable to perform processing using a program, and the program for use in the integrated circuit comprises a memory access control step for, when an operation mode of the integrated circuit is switched from the normal mode to the protection mode, controlling at least one of the plurality of execution units to execute the protected program, and permit only the at least one execution unit that has executed the protected program to access the internal memory.

(38) The present invention may be any combination of the above-described embodiments and modifications.

INDUSTRIAL APPLICABILITY

The present invention can be used in the industry for manufacturing and retailing system LSIs each including a plurality of CPUs and handling information to be protected, the industry for manufacturing and retailing appliances including such a system LSI, and the industry for supplying, by using such appliances, services using information to be protected.

The invention claimed is:

1. An information processing device that performs operations by switching between a first processing relating to information that needs to be protected and a second processing that is different than the first processing, the information processing device comprising:
   a secure memory operable to store therein the information that needs to be protected;
   a plurality of processors, each of the plurality of processors being operable to operate in accordance with a program;
   a bus that connects the plurality of processors with each other; and
   a control unit operable to, (i) during a first period for performing the first processing, permit at least one of the plurality of processors to access the secure memory via the bus, and perform one of (a) stopping operations of the others of the plurality of processors and (b) prohibiting the others of the plurality of processors from accessing the secure memory via the bus, and (ii) during a second period for performing the second processing, prohibit all of the plurality of processors from accessing the secure memory via the bus,
   wherein the control unit includes:
      a connection/disconnection subunit operable to connect the secure memory with the bus during the first period, and disconnect the secure memory from the bus during the second period; and
      an access control subunit operable to, during the first period, permit the at least one processor to access the secure memory, and stop the operations of the others of the plurality of processors,
   wherein the access control subunit stops the operations of the others of the plurality of processors by continually outputting reset signals to the others of the plurality of processors, and
   wherein the information processing device further comprises
      a switch unit operable to switch a reference destination address to be referred to by the at least one processor from another memory that is different than the secure memory to the secure memory, by designating, as an available interrupt vector, a first interrupt vector including an address that indicates a position within the secure memory instead of a second interrupt vector including an address that indicates a position within the other memory.

2. The information processing device of claim 1, wherein when the second processing is switched to the first processing, the access control subunit (i) saves each of the pieces of data stored in each of registers of all of the plurality of processors, and outputs the reset signals to all of the plurality of processors after the pieces of data stored in the registers have been saved, and (ii) stops outputting the reset signal to the at least one processor after a predetermined period has elapsed.

3. The information processing device of claim 2, wherein after the first processing has been performed, the access control subunit (i) restores the saved pieces of data to the registers of all of the plurality of processors, respectively, and (ii) stops outputting the reset signals to the others of the plurality of the processors, and
wherein before the access control subunit stops outputting the reset signals to the others of plurality of the processors, the switch unit switches the reference destination address to be referred to by the at least one processor from the secure memory to the other memory by designating the second interrupt vector as an available interrupt vector instead of the first interrupt vector.

4. The information processing device of claim 1, wherein the access control subunit stops the others of the plurality of processors by controlling the others of the plurality of processors to stop clock signals of the others of the plurality of processors, respectively.

5. The information processing device of claim 1, wherein the access control subunit stops the others of the plurality of processors by suspending supply of an electric power to the others of the plurality of processors.

6. The information processing device of claim 1, wherein the access control subunit stops the others of the plurality of processors by controlling the others of the plurality of processors to refer to an address in which an instruction is written, the instruction indicating to perform no processing.

7. The information processing device of claim 1, wherein during the first period, the control unit prohibits the at least one processor from accessing the other memory.

8. The information processing device of claim 7, wherein the control unit prohibits the at least one processor from accessing the other memory by disconnecting the at least one processor from the other memory.

9. The information processing device of claim 8, wherein the control unit disconnects the at least one processor from the other memory by disconnecting the other memory from the bus.

10. The information processing device of claim 1, wherein the information processing device includes the other memory different than the secure memory,
wherein the other memory is used during the second period, and
wherein the information processing device further comprises
an integrated circuit including the secure memory, the plurality of processors, the bus, and the control unit.

11. An integrated circuit that performs operations by switching between a first processing relating to information that needs to be protected and a second processing that is different than the first processing, the integrated circuit comprising:
a secure memory operable to store therein the information that needs to be protected;
a plurality of processors, each of the plurality of processors being operable to operate in accordance with a program;
a bus that connects the plurality of processors with each other; and
a control unit operable to, (i) during a first period for performing the first processing, permit at least one of the plurality of processors to access the secure memory via the bus, and perform one of (a) stopping operations of the others of the plurality of processors and (b) prohibiting the others of the plurality of processors from accessing the secure memory via the bus, and (ii) during a second period for performing the second processing, prohibit all of the plurality of processors from accessing the secure memory via the bus,
wherein the control unit includes:
a connection/disconnection subunit operable to connect the secure memory with the bus during the first period, and disconnect the secure memory from the bus during the second period; and
an access control subunit operable to, during the first period, permit the at least one processor to access the secure memory, and stop the operations of the others of the plurality of processors,
wherein the access control subunit stops the operations of the others of the plurality of processors by continually outputting reset signals to the others of the plurality of processors, and
wherein the integrated circuit further comprises
a switch unit operable to switch a reference destination address to be referred to by the at least one processor from another memory that is different than the secure memory to the secure memory, by designating, as an available interrupt vector, a first interrupt vector including an address that indicates a position within the secure memory instead of a second interrupt vector including an address that indicates a position within the other memory.

12. A method for use in an information processing device that performs operations by switching between a first processing relating to information that needs to be protected and a second processing that is other than the first processing, wherein the information processing device includes: (i) a secure memory operable to store therein the information that needs to be protected; (ii) a plurality of processors, each of the plurality of processors being operable to operate in accordance with a program; and (iii) a bus that connects the plurality of processors with each other, the method comprising:
a control step for, (i) during a first period for performing the first processing, permitting at least one of the plurality of processors to access the secure memory via the bus, and performing one of (a) stopping operations of the others of the plurality of processors and (b) prohibiting the others of the plurality of processors from accessing the secure memory via the bus, and (ii) during a second period for performing the second processing, prohibiting all of the plurality of processors from accessing the secure memory via the bus,
wherein the control step includes:
a connection/disconnection substep for connecting the secure memory with the bus during the first period, and disconnecting the secure memory from the bus during the second period; and
an access control substep for, during the first period, permitting the at least one processor to access the secure memory, and stopping the operations of the others of the plurality of processors,
wherein the access control substep stops the operations of the others of the plurality of processors by continually outputting reset signals to the others of the plurality of processors, and
wherein the method further comprises
a switch step for switching a reference destination address to be referred to by the at least one processor from another memory that is different than the secure memory to the secure memory, by designating, as an available interrupt vector, a first interrupt vector including an address that indicates a position within the secure memory instead of a second interrupt vector including an address that indicates a position within the other memory.

13. A non-transitory computer readable recording medium having stored thereon a program for use in an information processing device that performs operations by switching between a first processing relating to information that needs to be protected and a second processing that is different than the first processing,
wherein the information processing device includes: (i) a secure memory operable to store therein the information that needs to be protected; (ii) a plurality of processors, each of the plurality of processors being operable to operate in accordance with a program; and (iii) a bus that connects the plurality of processors with each other, and
wherein, when executed the program causes the information processing device to perform a method comprising:
a control step for, (i) during a first period for performing the first processing, permitting at least one of the plurality of processors to access the secure memory via the bus, and performing one of (a) stopping operations of the others of the plurality of processors and (b) prohibiting the others of the plurality of processors from accessing the secure memory via the bus, and (ii) during a second period for performing the second processing, prohibiting all of the plurality of processors from accessing the secure memory via the bus,
wherein the control step includes:
a connection/disconnection substep for connecting the secure memory with the bus during the first period, and disconnecting the secure memory from the bus during the second period; and
an access control substep for, during the first period, permitting the at least one processor to access the secure memory, and stopping the operations of the others of the plurality of processors,
wherein the access control substep stops the operations of the others of the plurality of processors by continually outputting reset signals to the others of the plurality of processors, and
wherein the method further comprises
a switch step for switching a reference destination address to be referred to by the at least one processor from another memory that is different than the secure memory to the secure memory, by designating, as an available interrupt vector, a first interrupt vector including an address that indicates a position within the secure memory instead of a second interrupt vector including an address that indicates a position within the other memory.

14. An information processing device that performs operations by switching between a first processing relating to information that needs to be protected and a second processing that is different than the first processing, the information processing device comprising:
a secure memory operable to store therein the information that needs to be protected;
a plurality of processors, each of the plurality of processors being operable to operate in accordance with a program;
a bus that connects the plurality of processors with each other; and
a control unit operable to, (i) during a first period for performing the first processing, permit at least one of the plurality of processors to access the secure memory via the bus, and perform one of (a) stopping operations of the others of the plurality of processors and (b) prohibiting the others of the plurality of processors from accessing the secure memory via the bus, and (ii) during a second period for performing the second processing, prohibit all of the plurality of processors from accessing the secure memory via the bus,
wherein the control unit includes:
a connection/disconnection subunit operable to connect the secure memory with the bus during the first period, and disconnect the secure memory from the bus during the second period; and
an access control subunit operable to, during the first period, permit the at least one processor to access the secure memory, and stop the operations of the others of the plurality of processors,
wherein the access control subunit stops the operations of the others of the plurality of processors by continually outputting reset signals to the others of the plurality of processors,
wherein when the second processing is switched to the first processing, any one of the plurality of processors executes a switching program that includes an instruction to switch a reference destination address to be referred to by the at least one processor from another memory that is different than the secure memory to the secure memory, and
wherein the information processing device further comprises
a switch unit operable to switch the reference destination address of the at least one processor from the other memory to the secure memory in accordance with the instruction included in the executed switching program.

15. An information processing device that performs operations by switching between a first processing relating to information that needs to be protected and a second processing that is different than the first processing, the information processing device comprising:
a secure memory operable to store therein the information that needs to be protected;
a plurality of processors, each of the plurality of processors being operable to operate in accordance with a program;
a bus that connects the plurality of processors with each other; and
a control unit operable to, (i) during a first period for performing the first processing, permit at least one of the plurality of processors to access the secure memory via the bus, and perform one of (a) stopping operations of the others of the plurality of processors and (b) prohibiting the others of the plurality of processors from accessing the secure memory via the bus, and (ii) during a second period for performing the second processing, prohibit all of the plurality of processors from accessing the secure memory via the bus,
wherein the control unit includes:
a connection/disconnection subunit operable to connect the secure memory with the bus during the first period, and disconnect the secure memory from the bus during the second period; and
an access control subunit operable to, during the first period, permit the at least one processor to access the secure memory, and stop the operations of the others of the plurality of processors,
wherein the access control subunit stops the operations of the others of the plurality of processors by continually outputting reset signals to the others of the plurality of processors, wherein the secure memory stores a protected program including a procedure for performing the first processing, and wherein the information processing device further comprises:

a comparison unit operable to, when the second processing is switched to the first processing, compare a priority level of a program executed during the second period with a priority level of the protected program; and a switch unit operable to, if the priority level of the protected program is higher than the priority level of the program executed during the second period, switch a reference destination address to be referred to by the at least one processor from another memory that is different than the secure memory to the secure memory.

16. An information processing device that performs operations by switching between a first processing relating to information that needs to be protected and a second processing that is different than the first processing, the information processing device comprising:

a secure memory operable to store therein the information that needs to be protected;

a plurality of processors, each of the plurality of processors being operable to operate in accordance with a program;

a bus that connects the plurality of processors with each other; and a control unit operable to, (i) during a first period for performing the first processing, permit at least one of the plurality of processors to access the secure memory via the bus, and perform one of (a) stopping operations of the others of the plurality of processors and (b) prohibiting the others of the plurality of processors from accessing the secure memory via the bus, and (ii) during a second period for performing the second processing, prohibit all of the plurality of processors from accessing the secure memory via the bus, wherein the control unit includes:

a connection/disconnection subunit operable to connect the secure memory with the bus during the first period, and disconnect the secure memory from the bus during the second period; and an access control subunit operable to, during the first period, permit the at least one processor to access the secure memory, and stop the operations of the others of the plurality of processors, and wherein when the second processing is switched to the first processing, the access control subunit controls the at least one processor to refer to the secure memory by outputting a signal to the at least one processor, the signal instructing to switch a reference destination address to be referred to by the at least one processor from another memory that is different than the secure memory to the secure memory.

17. An information processing device that performs operations by switching between a first processing relating to information that needs to be protected and a second processing that is different than the first processing, the information processing device comprising:

a secure memory operable to store therein the information that needs to be protected;

a plurality of processors, each of the plurality of processors being operable to operate in accordance with a program;

a bus that connects the plurality of processors with each other; and a control unit operable to, (i) during a first period for performing the first processing, permit at least one of the plurality of processors to access the secure memory via the bus, and perform one of (a) stopping operations of the others of the plurality of processors and (b) prohibiting the others of the plurality of processors from accessing the secure memory via the bus, and (ii) during a second period for performing the second processing, prohibit all of the plurality of processors from accessing the secure memory via the bus, wherein each of the plurality of processors is identified by a unique identifier, and wherein the control unit includes:

an identifier storage subunit operable to store a first identifier corresponding to the at least one processor during the first period;

an acquisition subunit operable to acquire a second identifier corresponding to a processor from among the plurality of processors that requests to access the secure memory;

a comparison subunit operable to compare the second identifier with the first identifier; and an access judgment subunit operable to, if the second identifier does not match the first identifier, prohibit the processor that requests to access the secure memory from accessing the secure memory, and if the second identifier matches the first identifier, permit the processor that requests to access the secure memory to access the secure memory.

18. The information processing device of claim 17, wherein the at least one processor includes a switch unit operable to, when the second processing is switched to the first processing, switch a reference destination address to be referred to by the at least one processor from another memory that is different than the secure memory to the secure memory, and output the first identifier corresponding to the at least one processor to the control unit, wherein upon receiving the first identifier from the switch unit included in the at least one processor, the control unit stores the received first identifier in the identifier storage subunit, and wherein when the first processing is switched to the second processing, the control unit deletes the first identifier from the identifier storage subunit.

19. An information processing device that performs operations by switching between a first processing relating to information that needs to be protected and a second processing that is other than the first processing, the information processing device comprising:

a secure memory operable to store therein the information that needs to be protected;

a plurality of processors, each of the plurality of processors being operable to operate in accordance with a program;

a bus that connects the plurality of processors with each other; and a control unit operable to, (i) during a first period for performing the first processing, permit at least one of the plurality of processors to access the secure memory via the bus, and perform one of (a) stopping operations of the others of the plurality of processors and (b) prohibiting the others of the plurality of processors from accessing the secure memory via the bus, and (ii) during a second period for performing the second processing, prohibit all of the plurality of processors from accessing the secure memory via the bus, wherein when one of the plurality of processors outputs to the control unit an access request for accessing the secure memory, the one of the plurality of processors outputs, to the control unit, processing information indicating whether the one of the plurality of processors is performing the first processing with the access request, wherein if the processing information indicates that the one of the plurality of processors is performing the first processing, the control unit permits the one of the plurality of processors to access the secure memory, and wherein if the processing information indicates that the one of the plurality of processors is not performing the first processing, the control unit prohibits the one of the plurality of processors from accessing the secure memory.

20. The information processing device of claim 19, wherein each of the plurality of processors includes:
  an information storage unit operable to store the processing information; and
  a switch unit operable to, when the second processing is switched to the first processing, switch a reference destination address to be referred to by the processor from another memory that is different than the secure memory to the secure memory, and change the processing information stored in the information storage unit to indicate that the first processing is performed.

21. An information processing device that performs operations by switching between a first processing relating to information that needs to be protected and a second processing that is different than the first processing, the information processing device comprising:
  a secure memory operable to store therein the information that needs to be protected;
  a plurality of processors, each of the plurality of processors being operable to operate in accordance with a program;
  a bus that connects the plurality of processors with each other; and
  a control unit operable to, (i) during a first period for performing the first processing, permit at least one of the plurality of processors to access the secure memory via the bus, and perform one of (a) stopping operations of the others of the plurality of processors and (b) prohibiting the others of the plurality of processors from accessing the secure memory via the bus, and (ii) during a second period for performing the second processing, prohibit all of the plurality of processors from accessing the secure memory via the bus,
  wherein the control unit includes:
    a connection/disconnection subunit operable to connect the secure memory with the bus during the first period, and disconnect the secure memory from the bus during the second period; and
    an access control subunit operable to, during the first period, permit the at least one processor to access the secure memory, and stop the operations of the others of the plurality of processors, and
  wherein the information processing device further comprises
    a switch unit operable to switch a reference destination address to be referred to by the at least one processor from another memory that is different than the secure memory to the secure memory, by designating, as an available interrupt vector, a first interrupt vector including an address that indicates a position within the secure memory instead of a second interrupt vector including an address that indicates a position within the other memory.

22. An integrated circuit that performs operations by switching between a first processing relating to information that needs to be protected and a second processing that is different than the first processing, the integrated circuit comprising:
  a secure memory operable to store therein the information that needs to be protected;
  a plurality of processors, each of the plurality of processors being operable to operate in accordance with a program;
  a bus that connects the plurality of processors with each other; and
  a control unit operable to, (i) during a first period for performing the first processing, permit at least one of the plurality of processors to access the secure memory via the bus, and perform one of (a) stopping operations of the others of the plurality of processors and (b) prohibiting the others of the plurality of processors from accessing the secure memory via the bus, and (ii) during a second period for performing the second processing, prohibit all of the plurality of processors from accessing the secure memory via the bus,
  wherein the control unit includes:
    a connection/disconnection subunit operable to connect the secure memory with the bus during the first period, and disconnect the secure memory from the bus during the second period; and
    an access control subunit operable to, during the first period, permit the at least one processor to access the secure memory, and stop the operations of the others of the plurality of processors, and
  wherein the information processing device further comprises
    a switch unit operable to switch a reference destination address to be referred to by the at least one processor from another memory that is different than the secure memory to the secure memory, by designating, as an available interrupt vector, a first interrupt vector including an address that indicates a position within the secure memory instead of a second interrupt vector including an address that indicates a position within the other memory.

23. A method for use in an information processing device that performs operations by switching between a first processing relating to information that needs to be protected and a second processing that is different than the first processing, the information processing device including: (i) a secure memory operable to store therein the information that needs to be protected; (ii) a plurality of processors, each of the plurality of processors being operable to operate in accordance with a program; and (iii) a bus that connects the plurality of processors with each other, the method comprising:
  a control step for, (i) during a first period for performing the first processing, permitting at least one of the plurality of processors to access the secure memory via the bus, and performing one of (a) stopping operations of the others of the plurality of processors and (b) prohibiting the others of the plurality of processors from accessing the secure memory via the bus, and (ii) during a second period for performing the second processing, prohibiting all of the plurality of processors from accessing the secure memory via the bus,
  wherein the control step includes:
    a connection/disconnection substep for connecting the secure memory with the bus during the first period, and disconnecting the secure memory from the bus during the second period; and an access control substep for, during the first period, permitting the at least one processor to access the secure memory, and stopping the operations of the others of the plurality of processors, and wherein the method further comprises
a switching step for switching a reference destination address to be referred to by the at least one processor from another memory that is different than the secure memory to the secure memory, by designating, as an available interrupt vector, a first interrupt vector including an address that indicates a position within the secure memory instead of a second interrupt vector including an address that indicates a position within the other memory.

24. A non-transitory computer readable recording medium having stored thereon a program for use in an information processing device that performs operations by switching between a first processing relating to information that needs to be protected and a second processing that is different than the first processing, wherein the information processing device including: (i) a secure memory operable to store therein the information that needs to be protected; (ii) a plurality of processors, each of the plurality of processors being operable to operate in accordance with a program; and (iii) a bus that connects the plurality of processors with each other, and wherein, when executed, the program causes the information processing device to perform a method comprising:

a control step for, (i) during a first period for performing the first processing, permitting at least one of the plurality of processors to access the secure memory via the bus, and performing one of (a) stopping operations of the others of the plurality of processors and (b) prohibiting the others of the plurality of processors from accessing the secure memory via the bus, and (ii) during a second period for performing the second processing, prohibiting all of the plurality of processors from accessing the secure memory via the bus, wherein the control step includes:
a connection/disconnection substep for connecting the secure memory with the bus during the first period, and disconnecting the secure memory from the bus during the second period; and
an access control substep for, during the first period, permitting the at least one processor to access the secure memory, and stopping the operations of the others of the plurality of processors, and wherein the method further comprises
a switching step for switching a reference destination address to be referred to by the at least one processor from another memory that is different than the secure memory to the secure memory, by designating, as an available interrupt vector, a first interrupt vector including an address that indicates a position within the secure memory instead of a second interrupt vector including an address that indicates a position within the other memory.

* * * * *